United States Patent [19]
Takimoto et al.

[11] Patent Number: 5,966,003
[45] Date of Patent: Oct. 12, 1999

[54] DC-DC CONVERTER CONTROL CIRCUIT

[75] Inventors: Kyuichi Takimoto; Takashi Matsumoto; Toshiyuki Matsuyama; Seiya Kitagawa, all of Kawasaki, Japan

[73] Assignee: Fujitsu Limited, Kawasaki, Japan

[21] Appl. No.: 09/017,814

[22] Filed: Feb. 3, 1998

[30]    Foreign Application Priority Data

May 15, 1997  [JP]  Japan .................................... 9-125972
Aug. 29, 1997 [JP]  Japan .................................... 9-234718

[51] Int. Cl.⁶ ................................................... G05F 1/613
[52] U.S. Cl. ........................................... 323/224; 323/222
[58] Field of Search .................................... 323/224, 282, 323/284, 285, 901, 222

[56]    References Cited

U.S. PATENT DOCUMENTS

| | | | |
|---|---|---|---|
| 4,716,510 | 12/1987 | Pace et al. | 363/49 |
| 4,806,842 | 2/1989 | Bittner | 323/222 |
| 5,646,513 | 7/1997 | Riggio, Jr. | 323/282 |

*Primary Examiner*—Shawn Riley
*Attorney, Agent, or Firm*—Nikaido, Marmelstein, Murray & Oram LLP

[57]    ABSTRACT

A control circuit for controlling an output voltage of a DC—DC converter which supplies power to various semiconductor device, such as a processor and a memory, by way of an output transistor. The control circuit drives the output transistor in response to an external control signal. The control circuit gradually reduces an operating time of the output transistor by performing a discharge operation in response to the external control signal being inactive.

29 Claims, 18 Drawing Sheets

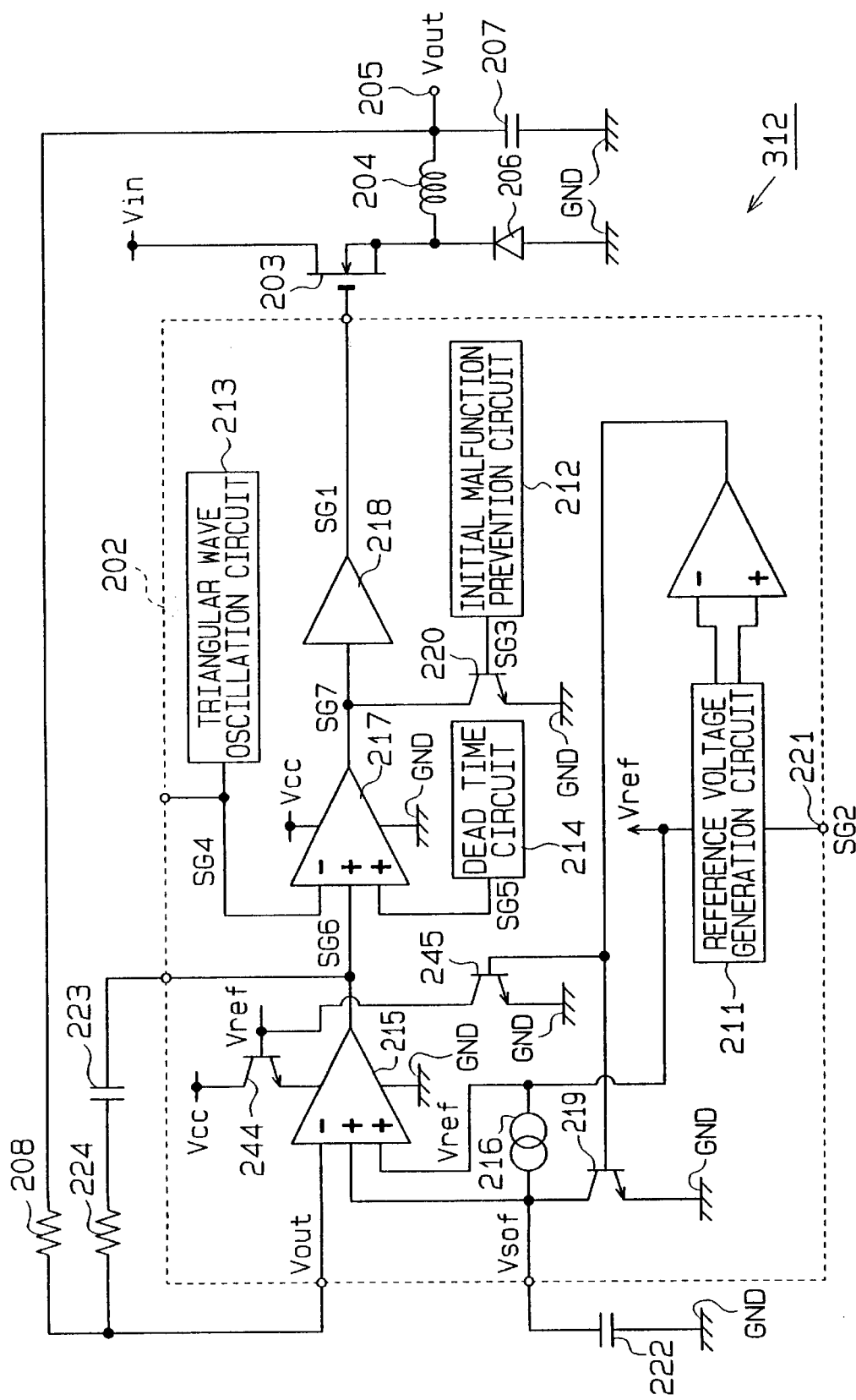

DC-DC CONVERTER CONTROL CIRCUIT

BACKGROUND OF THE INVENTION

The present invention relates to a control circuit for controlling an output voltage of a DC—DC converter. More particularly, the present invention relates to a control circuit for use with a DC—DC converter which supplies operational power to various types of semiconductor integrated circuit (IC) devices, such as a central processing unit (CPU) and a memory (RAM, ROM, etc.), mounted on any of various types of electronic apparatuses.

In portable electronic equipment which operates on power from a battery serving as a power source, if an internal circuit must be supplied with a DC voltage differing from the voltage of the battery, the desired DC voltage is produced by a DC—DC converter which operates on power from a battery power source. If a plurality of source voltages are used, there is a risk of damaging a device if a sequence of turn-on and shutdown of the power sources is not taken account. Accordingly, there is a need to control the rising and falling forms of an output voltage from the DC—DC converter.

FIG. 1 shows an example of a conventional DC—DC converter used as a power supply circuit of semiconductor integrated circuit devices, such as a CPU or a microcomputer. The DC—DC converter 101 comprises a control circuit 102 formed on a single integrated circuit chip, and a plurality of external elements. The control circuit 102 receives a control signal CTL and is activated when the control signal CTL is high.

A first output signal OUT1 of the control circuit 102 is input to the gate of an output transistor 103, and the drain of the output transistor 103 is connected to a power source Vcc. The output transistor 103 is an N-channel MOS transistor.

The source of the output transistor 103 is connected to the drain of a synchronous rectifying transistor 104, and a second output signal OUT2 from the control circuit 102 is input to the gate of the synchronous rectifying transistor 104 whose source is connected to a ground GND. The synchronous rectifying transistor 104 is also an N-channel MOS transistor.

The source of the output transistor 103 is connected to an output terminal To via an output coil 105. The source of the output transistor 103 is also connected to the cathode of a fly-wheel diode 106 whose anode is connected to the ground GND. The output terminal To is connected to the ground GND via a capacitor 107.

In the DC—DC converter 101, the first and second output signals OUT1 and OUT2 are output from the control circuit 102 when the control circuit 102 is activated. The first and second output signals OUT1 and OUT2 are output in the form of complementary pulse signals. Accordingly, the output transistor 103 and the synchronous rectifying transistor 104 are alternately turned on.

An electric current output from the output transistor 103 is smoothed by means of the output coil 105 and the capacitor 107 through switching operation of the output transistor 103. When the output transistor 103 is turned off, an output voltage Vo output from the output terminal To is smoothed by means of the electrical current supplied to the output coil 105 via the flywheel diode 106 from the capacitor 107. Further, the synchronous rectifying transistor 104 is turned on by the second output signal OUT2, so that a forward voltage drop of the flywheel diode 106 is reduced to substantially zero, thereby improving smoothing efficiency.

At this time, the synchronous rectifying transistor 104 is turned on, after the output transistor 103 has been turned off, and is turned off before the output transistor 103 is turned back on. Therefore, a through current is prevented from flowing from the power source Vcc to the ground GND via the output transistor 103 and the synchronous rectifying transistor 104.

Through the foregoing operations, a DC output voltage Vo is output from the output terminal To, and the voltage level of the output voltage Vo is maintained constant by adjustment of the duty factor of each of the first and second output signals OUT1 and OUT2.

If the control signal CTL goes low, deactivating the control circuit 102 while the output transistor 103 is performing a switching operation, the output transistor 103 and the synchronous rectifying transistor 104 are held in an off state.

The electric charge stored in the capacitor 107 is discharged via a load connected to the output terminal To. As a result, as shown in FIG. 2, the output voltage Vo is reduced to low (ground GND).

At this time, the time required for the output voltage Vo to decrease to low differs according to the value of the discharge current flowing into the load and the time constant defined by the capacitance of the capacitor 107. Accordingly, the time required for the output voltage Vo to decrease to low is dependent on the load connected to the output terminal To.

Under these circumstances, the time required to stop the supply of power to the load in response to the trailing edge of the control signal CTL becomes unstable. For this reason, in the semiconductor integrated circuit device that operates on a plurality of source voltages, there arises a risk of erroneous operations of a CPU, or the like, connected to the power supply circuit as a load.

As indicated by a dotted line in FIG. 1, an N-channel MOS transistor, which is turned on when the control signal CTL goes low, is connected as a discharge transistor 108 between the output terminal To and the ground GND. The current drive capability of the discharge transistor 108 is set to be sufficiently greater than the discharge current drive capability of the load.

With the foregoing configuration, the rate at which the output voltage Vo decreases, in response to the reduction of the voltage level of the control signal CTL, to low level is substantially constant, as determined by the time constant of the capacitance 107 and the discharge transistor 108, regardless of the load.

The foregoing configuration, however, requires addition of the discharge transistor 108 having a large current drive capability, thereby increasing the cost and the size of the DC—DC converter.

If the DC—DC converter is configured such that the synchronous rectifying transistor 104 is turned on when the control signal CTL goes low, there is no need to add the discharge transistor 108 to the DC—DC converter.

However, such a configuration requires addition to the control circuit 102 of a circuit for turning on the synchronous rectifying transistor 104 when the control signal CTL goes low. Accordingly, the chip area of the semiconductor device equipped with the control circuit 102 is increased, thereby hindering a reduction in the size of the DC—DC converter.

A plurality of semiconductor integrated circuit devices (ICs) are mounted on an electronic apparatus. These semiconductor integrated circuit devices individually require operational power. In general, the operational power is provided by a DC—DC converter. If there is a failure to provide the ICs with stable power supply or to execute a power-up sequence of the ICs, the ICs cause faulty operation. For this reason, there is a demand for highly accurate power-up operation.

A DC power produced by conversion of a commercial power by means of a power supply circuit (an AC-DC converter) is commonly used as the power source for various types of electronic equipment. The thus-converted DC power is further converted into operational power corresponding to each of the ICs by means of the DC—DC converter 101. The thus-converted operational power is supplied to the corresponding IC. Referring to FIG. 5, an electronic device 300 includes semiconductor integrated circuit devices 301, such as a central processing unit (CPU), a chip selector, and a memory (RAM or ROM); a power supply circuit 302; and a DC—DC converter 201. The power supply circuit 302 converts a commercial power VA into various types of DC power Vcc and Vin. The DC—DC converter 201 regulates the thus-converted DC voltage Vin to obtain stable operational power (i.e., an output voltage Vout) and supplies the thus-obtained operational power to each of the semiconductor integrated circuit devices 301.

FIG. 3 is a circuit diagram of the DC—DC converter 201. The DC—DC converter 201 comprises a control circuit 202 formed on a one-chip semiconductor integrated circuit device, and a plurality of external elements. A signal SG1 output from the control circuit 202 is supplied to the gate of an output transistor 203 composed of an enhanced N-channel MOS transistor. A DC supply voltage Vin is supplied to the drain of the output transistor 203 from the power supply circuit 302 shown in FIG. 5, and the source of the output transistor 203 is connected to an output terminal 205 via an output coil 204. The output terminal 205 is also connected to each of the semiconductor integrated circuit devices 301 which serve as loads.

The source of the output transistor 203 is connected to the cathode of the flywheel diode 206 composed of a Schottky diode. The anode of the flywheel diode 206 is connected to the ground GND. A junction between the output coil 204 and the output terminal 205 is connected to the ground GND via a capacitor 207, and a smoothing circuit is formed from a combination of the output coil 204 and the capacitor 207. The junction between the output coil 204 and the output terminal 205 is connected to the control circuit 202 via a resistor 208, such that the output voltage Vout is provided to the control circuit 202.

The control circuit 202 comprises a reference voltage generation circuit 211; an initial malfunction prevention circuit 212; a triangular wave oscillation circuit 213; a dead time circuit 214; an error amplification circuit 215; a constant current circuit 216; a PWM comparison circuit 217; an output circuit 218; and first and second transistors 219, 220.

A drive source voltage Vcc is supplied to the reference voltage generation circuit 211 from the power supply circuit 302, and the reference voltage generation circuit 211 receives a control signal SG2 from an unillustrated external device via an external control input terminal 221. The reference voltage generation circuit 211 is composed of a band-gap reference circuit and generates a reference voltage Vref (<Vcc) from the drive source voltage Vcc as a first reference voltage in response to the control signal SG2 being high. As shown in FIG. 4, if the control signal SG2 goes high at time t0, the reference voltage Vref rises at a given rate and reaches a specified voltage Vref1 (<Vcc). Subsequently, the reference voltage Vref is maintained at the specified voltage Vref1.

The initial malfunction prevention circuit 212 receives the drive source voltage Vcc from the power supply circuit 302 and the reference voltage Vref as a bias voltage from the reference voltage generation circuit 211. The initial malfunction prevention circuit 212 is designed to output a cancel signal SG3 which goes from high to low when the reference voltage Vref which is in the course of rising to the specified voltage Vref1 reaches a given voltage Vref2, as shown in FIG. 4; i.e., at time t1, at which time the reference voltage Vref reaches the bias voltage (=Vref2), which permits operation of the initial malfunction prevention circuit 212.

The triangular wave oscillation circuit 213 receives the drive source voltage Vcc from the power supply circuit 302 and the reference voltage Vref as the bias voltage from the reference voltage generation circuit 211. When the reference voltage Vref increases to a given voltage Vref3 (>Vref2) as shown in FIG. 4, the triangular wave oscillation circuit 213 commences at a point in time between time t1 and time t2, at which time the reference voltage Vref reaches the bias voltage (=Vref3), which permits oscillation of the triangular wave oscillation circuit 213, thereby outputting a triangular wave signal SG4 which oscillates within a given voltage range.

The dead time circuit 214 is composed of a potential dividing circuit including a plurality of resistors connected in series and receives the reference voltage Vref from the reference voltage generation circuit 211 and divides it. The thus-divided voltage is output as a limit signal SG5. As shown in FIG. 4, if the control signal SG2 goes high at time t0, the limit signal SG5 rises at a given rate, as does the reference voltage Vref. The limit signal SG5 reaches a rated or predetermined voltage Vk (<Vref1) at time t2 and is maintained at the rated voltage Vk thereafter. The rated voltage Vk of the limit signal SG5 is set to a value slightly lower than the maximum value of the triangular wave signal SG4 by control of the voltage-dividing ratio of the resistors in the dead time circuit 214. More specifically, the rated voltage Vk is set to a value such that the duty ratio of a pulse signal of an output signal SG1 from the output circuit 218 becomes 90% when the triangular wave signal SG4 is compared with the limit signal SG5 by means of the PWM comparison circuit 217.

The error amplification circuit 215 has an inverting input terminal, which serves as an input terminal for receiving a detected voltage, and first and second noninverting input terminals, which serve as first and second reference voltage input terminals. The inverting input terminal receives the output voltage Vout via the resistor 208. The error amplification circuit 215 receives the drive source voltage Vcc from the power supply circuit 302 and the reference voltage Vref as the bias voltage from the reference voltage generation circuit 211. The second noninverting input terminal of the error amplification circuit 215 is connected to the ground GND via an external capacitor 222 for gentle start-up purposes. The capacitor 222 receives a constant current from the constant current circuit 216, which operates on the reference voltage Vref received from the reference voltage generation circuit 211. The capacitor 222 is charged by the constant current received from the constant current circuit 216, and the charge voltage Vsof of the constant current increases to the reference voltage Vref. That is, the charge voltage Vsof serves as a second reference voltage with respect to the reference voltage Vref that serves as the first reference voltage. The charge voltage Vsof is produced by the reference voltage generation circuit 211 and the capacitor 222.

The second noninverting input terminal of the error amplification circuit 215 is also connected to the collector of the first transistor 219 for gentle start-up purposes, and the emitter of the first transistor 219 is connected to the ground GND. The base of the first transistor 219 receives the cancel signal SG3 from the initial malfunction prevention circuit 212. Accordingly, if the cancel signal SG3 drops to low from high at time t1 to thereby switch the first transistor 219 from an on state to an off state, the charging of the capacitor 222 with the constant current from the constant current circuit 216 is started. As a result, as shown in FIG. 4, the charge voltage Vsof starts increasing at time t1.

A series circuit comprising an external capacitor 223 and a resistor 224 is connected between an output terminal and the inverting input terminal of the error amplification circuit 215, thereby preventing oscillation of the error amplification circuit 215.

The error amplification circuit 215 compares either the reference voltage Vref or the charge voltage Vsof, whichever voltage is lower, with the output voltage Vout. The error amplification circuit 215 produces an error output signal SG6 by amplification of a difference between the thus-compared voltages and outputs the error output signal SG6 to the PWM comparison circuit 217 in the following stage.

As shown in FIG. 4, the error amplification circuit 215 outputs the output voltage SG6 corresponding to the reference voltage Vref without comparison and amplification until the reference voltage Vref reaches a given voltage; i.e., until time t1, at which time the initial malfunction prevention circuit 212 outputs the cancel signal SG3 low. In other words, since logical inversion occurs when at least one of the first and second noninverting input terminals has a voltage near zero volts, the bias voltage, or the error output signal SG6 having the same amplitude as that of the reference voltage Vref, is output.

After time t1, the error amplification circuit 215 compares the output voltage Vout with either the reference voltage Vref or the charge voltage Vsof, whichever voltage is lower, and amplifies a potential difference between the voltages.

The PWM comparison circuit 217 receives the drive source voltage Vcc from the power supply circuit 302 and has an inverting input terminal and first and second noninverting input terminals. The noninverting input terminal of the PWM comparison circuit 217 receives the triangular wave signal SG4 from the triangular wave oscillation circuit 213. The first noninverting input terminal of the PWM comparison circuit 217 receives an error input signal SG6 from the error amplification circuit 215. The second noninverting input terminal of the PWM comparison circuit 217 receives the limit signal SG5 from the dead time circuit 214.

The PWM comparison circuit 217 compares either the error output signal SG6 or the limit signal SG5, whichever has a lower voltage, with the triangular wave signal SG4. The PWM comparison circuit 217 outputs a pulse signal to the output circuit 218 as a duty control signal SG7, which goes low when the triangular wave signal SG4 has a voltage higher than that of the compared signal, and goes high when the triangular wave signal SG4 has a voltage equal to or smaller than that of the compared signal.

The output terminal of the PWM comparison circuit 217 is connected to the collector of the second transistor 220, and the emitter of the second transistor 220 is connected to the ground GND. The base of the second transistor 220 receives the cancel signal SG3 from the initial malfunction prevention circuit 212. Accordingly, when the cancel signal SG3 decreases to low to thereby turn off the second transistor 220, the duty control signal SG7 is output to the output circuit 218 in the following stage. The output circuit 218 receives the drive source voltage Vcc from the power supply circuit 302. The output circuit 218 outputs to the gate of the transistor 203 the duty control signal SG7 as the above-described output signal SG1.

The DC—DC converter 201 is in a suspended state when the reference voltage generation circuit 211 receives the control signal SG2 low from an external device while the drive source voltage Vcc is supplied to each of the circuits 211–213, 215, 217, and 218 in the control circuit 202 from the power supply circuit 302 shown in FIG. 5.

That is, the reference voltage Vref used for generating a reference voltage is zero volts. Accordingly, a reference voltage Vref of zero volts is supplied to the first noninverting input terminal of the error amplification circuit 215, and the initial error malfunction prevention circuit 212 receives the reference voltage Vref of zero volts. The cancel signal SG3 is high, and therefore the first and second transistors 219 and 220 are in an on state. As a result, the first noninverting input terminal of the error amplification circuit 215 is zero volts. Further, since the second transistor 220 is in an on state, the output signal SG1 goes low. Accordingly, the output transistor 203 is in an off state, and the output voltage Vout is zero volts.

When the control signal SG2 high is supplied to the reference voltage generation circuit 211 from an external device at time t0, the DC—DC converter 201 commences operation. In response to the control signal SG2 high, the reference voltage generation circuit 211 generates the reference voltage Vref on the basis of the drive source voltage Vcc. At this time, as shown in FIG. 4, the reference voltage Vref increases at a given rate to the specified voltage Vref1. The gradually increasing reference voltage Vref is supplied to the initial malfunction prevention circuit 212, the triangular wave oscillation circuit 213, the dead time circuit 214, the noninverting input terminal of the error amplification circuit 215, and the constant current circuit 216.

At this time, although the increasing reference voltage Vref is supplied to the first noninverting input terminal of the error amplification circuit 215, the charge voltage Vsof input to the second noninverting input terminal of the error amplification circuit 215 is zero volts. Therefore, the error output signal SG6 of the error amplification circuit 215 increases in such a way as to have the same magnitude as that of the increasing reference voltage Vref. Further, the dead time circuit 214 supplies to the PWM comparison circuit 217 the limit signal SG5 proportional to the reference voltage Vref.

Consequently, the PWM comparison circuit 217 compares the limit signal SG5 from the dead time circuit 214 with the triangular wave signal SG4 from the triangular wave oscillation circuit 213. At this time, the triangular wave oscillation circuit 213 has not yet commenced oscillation, and hence the triangular wave signal SG4 is zero volts. As a result, the PWM comparison circuit 217 outputs the duty control signal SG7 high. However, since the second transistor 220 is in an on state, the duty control signal SG7 goes low. The output circuit 218 still outputs the signal SG1 low, so that the output transistor 203 is left in an off state.

At time t1, the initial malfunction prevention circuit 212 outputs the cancel signal SG3 low to the base of each of the first and second transistors 219, 220, thereby turning off the first and second transistors 219, 220. When the first transistor 219 is turned off, the capacitor 222 commences accumulation of electric current, and the charge voltage Vsof is supplied to the second noninverting input terminal of the error amplification circuit 215. The charge voltage Vsof is lower than the reference voltage Vref, and hence the error amplification circuit 215 compares the output voltage Vout with the charge voltage Vsof and amplifies a difference between the voltages. The error output signal SG6 is then output to the PWM comparison circuit 217. Immediately after time t1, the output voltage Vout is zero volts, and the charge voltage Vsof is slightly larger than zero volts. Therefore, since the difference between the charge voltage Vsof and the output voltage Vout is small, the error output signal SG6 from the error amplification circuit 215 decreases.

At time t1, the triangular wave oscillation circuit 213 has not yet commenced oscillation. Therefore, the PWM comparison circuit 217 compares the limit signal SG5 with the triangular wave signal SG4 until the error output signal SG6 from the error amplification circuit 215 becomes smaller than the limit signal SG5 from the dead time circuit 214. When the error output signal SG6 becomes smaller than the limit signal SG5, the PWM comparison circuit 217 compares the error output signal SG6 with the triangular wave signal SG4. However, the triangular wave oscillation circuit 213 has not yet commenced oscillation, and the triangular wave signal SG4 is zero volts. As a result, the PWM comparison circuit 217 outputs a duty control signal SG7 high.

At this time, the second transistor 220 is in an off state, and therefore the duty control signal SG7 high is output to the output circuit 218. Accordingly, the signal SG1 output from the output circuit 218 goes high, and the output transistor 203 is turned on. The source voltage Vin is supplied to the output terminal 205 via the output coil 204, and the output voltage Vout increases to the source voltage Vin from zero volts. The thus-increasing output voltage Vout is supplied to the error amplification circuit 215.

The triangular wave oscillation circuit 213 oscillates and outputs the triangular wave SG4. When the triangular wave signal SG4 becomes greater than the error output signal SG6, the duty control signal SG7 of the PWM comparison circuit 217 goes low. The output signal SG1 from the output circuit 218 goes low, and the output transistor 203 is turned off. As a result, the supply of the source voltage Vin to the capacitor 207 is interrupted, so that the capacitor 207 discharges, thereby resulting in a drop in the output voltage Vout.

The error amplification circuit 215 compares the decreasing output voltage Vout with the charge voltage Vsof and outputs the error output signal SG6 to the PWM comparison circuit 217. Since the decreasing output voltage Vout is greater than the charge voltage Vsof, the error output signal SG6 from the error amplification circuit 215 is smaller than the triangular wave signal SG4. Accordingly, the PWM comparison circuit 217 maintains output of the duty control signal SG7 low. More specifically, the output voltage Vout continues decreasing while the output transistor 203 is maintained in an off state.

When the output voltage Vout becomes smaller than the charge voltage Vsof, the voltage of the error output signal SG6 from the error amplification circuit 215 increases and reaches a voltage range corresponding to the oscillation range of the triangular wave signal SG4. When the error output signal SG6 reaches the voltage range corresponding to the oscillation range of the triangular wave signal SG4, the PWM comparison circuit 217 outputs the duty control signal SG7, which goes high when the error output signal SG6 is larger than the triangular wave signal SG4, and goes low when the error output signal SG6 is smaller than the triangular wave signal SG4.

The DC—DC converter 201 controls the output voltage Vout such that it follows the increasing charge voltage Vsof. When the charge voltage Vsof reaches the specified voltage Vref1, the DC—DC converter 201 controls the output voltage Vout such that the output voltage Vout is maintained at the reference voltage Vref; i.e., the specified voltage Vref1.

That is, in an ordinary state, the error amplification circuit 215 compares the reference voltage Vref (predetermined voltage value Vref1) with the output voltage Vout and outputs the error output signal SG6 to the PWM comparison circuit 217. The PMW comparison circuit 217 compares the error output signal SG6 with the triangular wave signal SG4 and outputs the duty control signal SG7 in order to control the output transistor 203 through duty control. Thus, the DC—DC converter 201 is controlled such that the output voltage Vout is maintained at the reference voltage Vref (predetermined voltage value Vref1).

Upon power-up (i.e., upon receipt of the control signal SG2 low), the DC—DC converter 201 performs gentle start-up operation, in which the output voltage Vout is increased, gradually, to the specified voltage Vref1 of the reference voltage Vref. By means of a gentle start-up circuit composed of the first transistor 219, the capacitor 222, the error amplification circuit 215, and the constant current supply circuit 216, the DC—DC converter 201 increases the output voltage Vout to the reference voltage Vref in accordance with an increase in the charge voltage Vsof. In a case where the output voltage Vout is increased to the predetermined voltage specified voltage Vref1 of the reference voltage Vref, the output transistor 203 is kept in an on state. However, by virtue of the gentle start-up circuit, the output transistor 203 is prevented from being held in an on state, which in turn prevents deterioration of the transistor 203.

When the initial malfunction prevention circuit 212 outputs the cancel signal SG3 low at the time of the gentle start-up operation being performed by the DC—DC converter, the duty control signal SG7 immediately goes high irrespective of the charge voltage Vsof, and the output transistor 203 is immediately turned on. In other words, the gentle start-up function becomes temporarily inactive. This is attributable to the fact that the triangular wave oscillation circuit 213 does not oscillate even when the triangular wave oscillation circuit 213 goes low.

The output transistor 203 becomes temporarily turned on before the gentle start-up operation is performed, so that an excess electric current flows to the output transistor 203, thereby deteriorating the output transistor 203.

As a result of the output transistor 203 being abruptly turned on, the output voltage Vout sharply increases and becomes unstable. Such an unstable output voltage Vout is supplied as operational power to each of the semiconductor integrated circuit devices, thereby resulting in fault operations between the semiconductor integrated circuit devices. Particularly, a problem arises in a case where the semiconductor integrated circuit devices 301 are required to be turned on at predetermined timings; i.e., in accordance with a predetermined sequence.

Upon receipt of an uncertain input, the PWM comparison circuit 217 may output the duty control signal SG7 high. In such a case, similar problems arise.

Accordingly, a first object of the present invention is to provide a discharge control circuit which enables control of the trailing edge of an output voltage regardless of a load while reducing the size of a circuit area.

A second object of the present invention is to provide a DC—DC converter control circuit which ensures execution of gentle start-up operation and enables stable supply of an output voltage.

SUMMARY OF THE INVENTION

Briefly stated, the present invention provides a circuit for controlling an output transistor. The circuit includes: a first controller circuit, coupled to the output transistor, for driving the output transistor in response to an externally-input control signal; and a second controller circuit for performing a discharge operation in response to the input control signal being inactive and controlling the first controller circuit to gradually reduce an operating time of the output transistor when the discharge operation is performed.

The present invention provides a method of driving a DC—DC converter control circuit for controlling an output transistor. The method includes the steps of: providing an error amplification circuit having a reference voltage input terminal and a detected voltage input terminal, the reference voltage input terminal receiving a reference voltage which changes toward a specified voltage and maintains at the specified voltage, the detected voltage input terminal receiving a detected voltage produced by a switching action of the output transistor; comparing the reference voltage with the detected voltage and generating an error amplified output signal using the error amplification circuit; providing a triangular wave oscillation circuit for generating a triangular wave signal; providing a PWM comparison circuit having a first input terminal receiving the triangular wave signal and a second input terminal receiving the error amplified output signal; comparing the triangular wave signal and the error amplified output signal with the PWM comparison circuit to generate a control signal; turning on and off the output transistor by supplying the control signal thereto such that the detected voltage approaches the reference voltage; and holding the output transistor in an off state until the triangular wave oscillation circuit commences generation of the triangular wave signal.

The present invention provides a method of driving a DC—DC converter control circuit for controlling an output transistor. The method including the steps of; providing an error amplification circuit having a detected voltage input terminal and first and second reference voltage input terminals, the detected voltage input terminal receiving a detected voltage produced by a switching action of the output transistor, the first reference voltage input terminal receiving a first reference voltage as a specified voltage, and the second reference voltage input terminal receiving a second reference voltage which changes toward the first reference voltage; comparing the second reference voltage with the detected voltage using the error amplification circuit and generating an error amplified output signal when the second reference voltage changes; comparing the first reference voltage with the detected voltage using the error amplification circuit and generating an error amplified output signal when the second reference voltage is unchanged; providing a triangular wave oscillation circuit for generating a triangular wave signal; providing a PWM comparison circuit having a first input terminal receiving the triangular wave signal and a second input terminal receiving the error amplified output signal; comparing the triangular wave signal and the error amplified output signal with the PMW comparison circuit to generate a control signal; turning on and off the output transistor by supplying the control signal thereto such that the detected voltage approaches the first and second reference voltages; grounding the second reference voltage input terminal and at least one of the outputs of the error amplification circuit and the PWM comparison circuit until the triangular wave oscillation circuit commences generation of the triangular wave signal; and disconnecting the second reference voltage input terminal and the at least one of the outputs of the error amplification circuit and the PWM comparison circuit after the triangular wave oscillation circuit has commenced generation of the triangular wave signal.

The present invention provides a DC—DC converter control circuit for controlling an output transistor. The circuit includes: an error amplification circuit for receiving a reference voltage, which changes toward a specified voltage and maintains at the specified voltage, and receiving a detected voltage produced by a switching action of the output transistor, the error amplification circuit further comparing the reference voltage with the detected voltage to output an error amplified output signal; a triangular wave oscillation circuit for generating a triangular wave signal; a PWM comparison circuit, coupled to the error amplification circuit and the triangular wave oscillation circuit, for receiving the triangular wave signal and the error amplified output signal and for comparing the triangular wave signal and the error amplified output signal to generate a control signal, the control signal used for turning on and off the output transistor such that the detected voltage approaches the reference voltage; and a holding circuit for holding the output transistor in an off state until the triangular wave oscillation circuit commences generation of the triangular wave signal.

The present invention provides a DC—DC converter control circuit for controlling an output transistor. The circuit includes: an error amplification circuit for receiving a detected voltage produced by a switching action of the output transistor, a first reference voltage as a specified voltage, and a second reference voltage which changes toward the first reference voltage, the error amplification circuit further comparing the second reference voltage with the detected voltage to output an error amplified output signal when the second reference voltage changes, the error amplification circuit comparing the first reference voltage with the detected voltage to output the error amplified output signal when the second reference voltage is unchanged; a triangular wave oscillation circuit for generating a triangular wave signal; a PWM comparison circuit for receiving the triangular wave signal and the error amplified output signal and for comparing the triangular wave signal and the error amplified output signal to generate a control signal, the control signal used for controlling the output transistor such that the detected voltage approaches the first and second reference voltages; a short-circuit transistor connected between a ground and at least one of the outputs of the error amplification circuit and the PWM comparison circuit; a gentle start-up transistor connected between the ground and a second reference voltage input terminal of the error amplification circuit; and an initial malfunction prevention circuit for producing a cancel signal for turning on the short-circuit and gentle start-up transistors until the triangular wave oscillation circuit commences generation of the triangular wave signal and for turning off the short-circuit and gentle start-up transistors after the triangular wave oscillation circuit has commenced generation of the triangular wave signal.

The present invention provides a DC—DC converter control circuit for controlling an output transistor. The circuit includes: a reference voltage generation circuit for generating an reference voltage; an error amplification circuit for receiving the reference voltage which changes toward a specified voltage and maintains at the specified voltage, and receiving a detected voltage produced by a switching action of the output transistor, the error amplification circuit further comparing the reference voltage with the detected voltage to output an error amplified output signal; a triangular wave oscillation circuit for generating a triangular wave signal; a PWM comparison circuit, coupled to the error amplification circuit and the triangular wave oscillation circuit, for receiving the triangular wave signal and the error amplified output signal and for comparing the triangular wave signal and the error amplified output signal to generate a control signal, the control signal used for turning on and off the output transistor such that the detected voltage approaches to reference voltage; a reference voltage determination circuit for receiving the reference voltage and the specified voltage and for determining whether the reference voltage has reached the specified voltage and outputting a determination signal therefor; and a stop circuit for receiving the determination signal and turning off the output transistor while the reference voltage has reached to the specified voltage.

The present invention provides a DC—DC converter which includes: a smoothing circuit including an output coil and a capacitor; an output transistor, connected to the smoothing circuit, for causing an output voltage at an output terminal of the DC—DC converter; a first reference voltage generation circuit for generating a first reference voltage; a second reference voltage generation circuit for receiving the first reference voltage and producing a second reference voltage, which changes to a specified voltage; an error amplification circuit for receiving the output voltage, the first reference voltage as the specified voltage and the second reference voltage, the error amplification circuit further comparing the second reference voltage with the output voltage to output an error amplified output signal when the second reference voltage changes, the error amplification circuit comparing the first reference voltage with the output voltage to output the error amplified output signal when the second reference voltage is unchanged; a triangular wave oscillation circuit for generating a triangular wave signal; a PWM comparison circuit for receiving the triangular wave signal and the error amplified output signal and for comparing the triangular wave signal and the error amplified output signal to generate a control signal, the control signal for turning on and off the output transistor such that the output voltage approaches the first and second reference voltages; and a holding circuit for holding the output transistor in an off state until the triangular wave oscillation circuit commences generation of the triangular wave signal.

The present invention provides a DC—DC converter having a plurality of control circuits for controlling a plurality of output transistor, respectively. Each control circuit includes: an error amplification circuit for receiving a reference voltage, which changes toward a specified voltage and maintains at the specified voltage, and receiving a detected voltage produced by a switching action of the output transistor, the error amplification circuit further comparing the reference voltage with the detected voltage to output an error amplified output signal; a triangular wave oscillation circuit for generating a triangular wave signal; and a PWM comparison circuit, coupled to the error amplification circuit and the triangular wave oscillation circuit, for receiving the triangular wave signal and the error amplified output signal and for comparing the triangular wave signal and the error amplified output signal to generate a control signal, the control signal for turning on and off the output transistor such that the detected voltage approaches the reference voltage. One of the control circuits has a hold circuit for receiving a plurality of activation signals for activating the control circuits, respectively, and holding all of the output transistors in an off state until all of the activation signals are provided to the control circuits, respectively.

The present invention provides an electronic device having a DC—DC converter. The DC—DC converter includes: a smoothing circuit including an output coil and a capacitor; an output transistor, connected to the smoothing circuit, for causing an output voltage at an output terminal of the DC—DC converter; a first reference voltage generation circuit for generating a first reference voltage; a second reference voltage generation circuit for receiving the first reference voltage and producing a second reference voltage, which changes to a specified voltage; an error amplification circuit for receiving the output voltage, the first reference voltage as the specified voltage and the second reference voltage, the error amplification circuit further comparing the second reference voltage with the output voltage to output an error amplified output signal when the second reference voltage changes, the error amplification circuit comparing the first reference voltage with the output voltage to output the error amplified output signal when the second reference voltage is unchanged; a triangular wave oscillation circuit for generating a triangular wave signal; a PWM comparison circuit for receiving the triangular wave signal and the error amplified output signal and for comparing the triangular wave signal and the error amplified output signal to generate a control signal, the control signal for controlling the output transistor such that the output voltage approaches the first and second reference voltages; and a holding circuit for holding the output transistor in an off state until the triangular wave oscillation circuit commences generation of the triangular wave signal.

The present invention provides an electronic equipment having a DC—DC converter. The DC—DC converter has a plurality of control circuits for controlling a plurality of output transistors, respectively. Each control circuit includes: an error amplification circuit for receiving a reference voltage, which changes toward a specified voltage and maintains at the specified voltage, and receiving a detected voltage produced by a switching action of the output transistor, the error amplification circuit further comparing the reference voltage with the detected voltage to output an error amplified output signal; a triangular wave oscillation circuit for generating a triangular wave signal; and a PWM comparison circuit, coupled to the error amplification circuit and the triangular wave oscillation circuit, for receiving the triangular wave signal and the error amplified output signal and for comparing the triangular wave signal and the error amplified output signal to generate a control signal, the control signal for turning on and off the output transistor such that the detected voltage approaches the reference voltage. One of the control circuits has a hold circuit for receiving a plurality of activation signals for activating the control circuits, respectively, and holding all of the output transistors in an off state until all of the activation signals are provided to the control circuits, respectively.

The present invention provides a series regulator for supplying a power supply voltage to a load circuit. The regulator includes an output transistor coupled between a power supply and the load circuit and a circuit for controlling the output transistor. The circuit includes: a first controller circuit, coupled to the output transistor, for driving the output transistor in response to an externally-input control signal; and a second controller circuit for performing a discharge operation in response to the input control signal being inactive and controlling the first controller circuit to gradually reduce an operating time of the output transistor when the discharge operation is performed.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings, in which;

FIG. 16 is a circuit diagram showing a modification of the DC—DC converter according to the fifth embodiment;

DETAILED DESCRIPTION OF THE PREFERRED EMBODIMENTS

Figure 6:
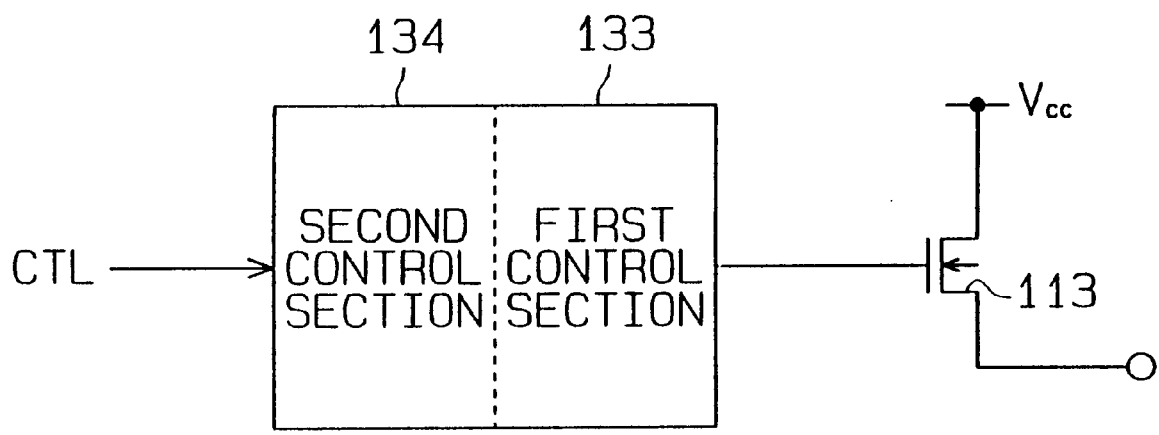
FIG. 6 is a block diagram showing an outline of the present invention.

In the drawings, like numerals are used to designate like elements throughout. FIG. 6 shows the outline of a control circuit in accordance with the present invention. A first control section 133 controls the switching operation of an output transistor 113 on the basis of a control signal CTL input from an external device. A second control section 134 gradually reduces a period of time in which the output transistor 113 is turned on, by utilization of the discharging operation of a capacitor (not shown) resulting from suspension of the input of the control signal CTL.

First Embodiment

Figure 7:
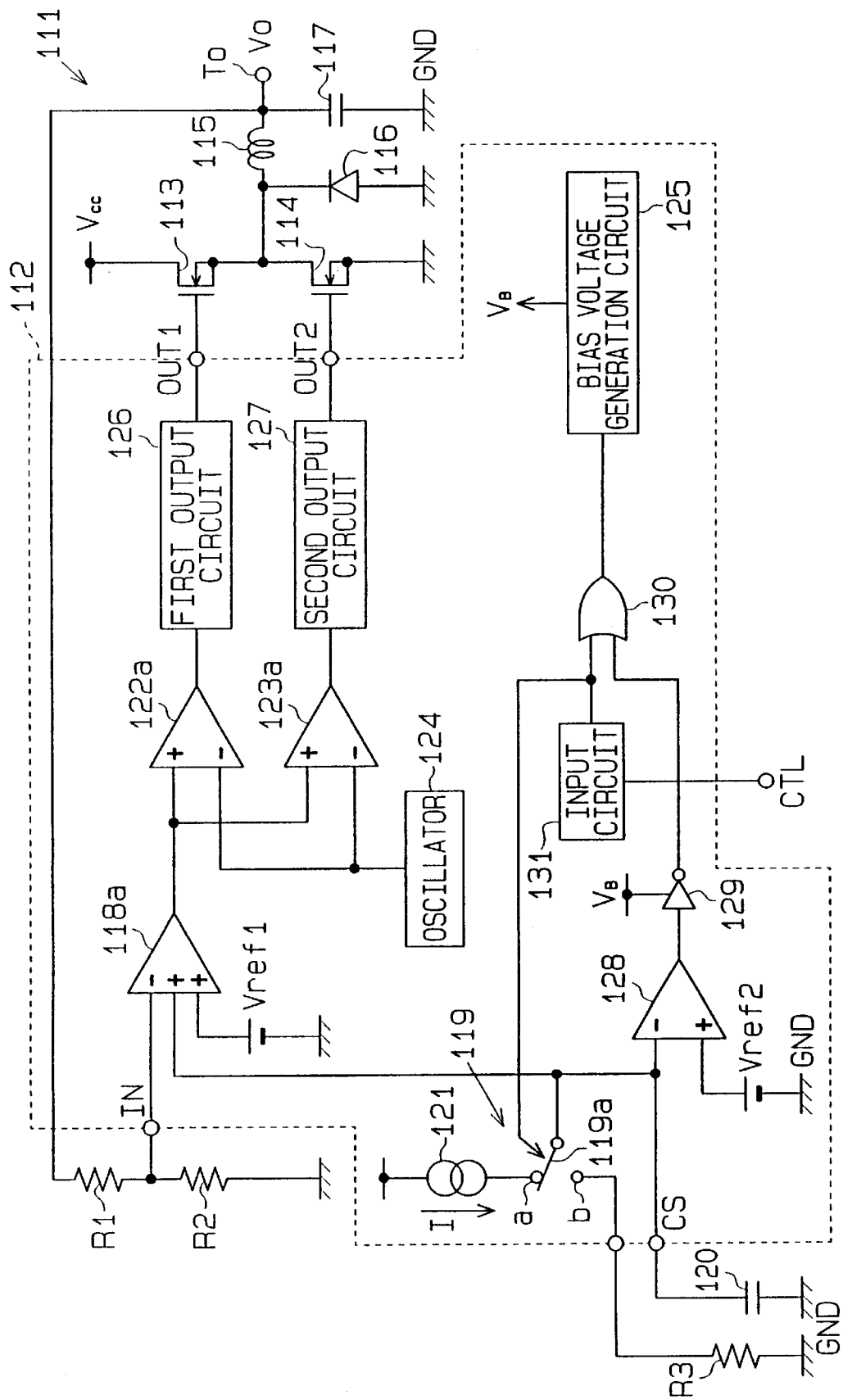
FIG. 7 is a circuit diagram showing a DC—DC converter according to a first embodiment of the present invention.

FIG. 7 shows a DC—DC converter in accordance with a first embodiment of the present invention.

A DC—DC converter 111 comprises a control circuit 112 preferably formed on a single chip integrated circuit and a plurality of external elements. A first output signal OUT1 from the control circuit 112 is output to the gate of an output transistor 113. The output transistor is preferably an N-channel MOS transistor, and the drain of the output transistor 113 is connected to a power source Vcc.

The source of the output transistor 113 is connected to the drain of a synchronous rectifying transistor 114 composed of an N-channel MOS transistor. The gate of the transistor 114 receives a second output signal OUT2 from the control circuit 112, and the source of the transistor 114 is connected to a ground GND.

The source of the output transistor 113 is connected to an output terminal To via an output coil 115 and is also connected to the cathode of a flywheel diode 116. The anode of the flywheel diode 116 is connected to the ground GND. The output terminal To is connected to the ground GND via a capacitor 117.

The output transistor 113, the synchronous rectifying transistor 114, the output coil 115, the flywheel diode 116, and the capacitor 117 operate in the same manner as in the previously-described conventional DC—DC converter.

The output terminal To is connected to the ground GND via resistors R1, R2. In order to detect a voltage Vo output from the output terminal To, the resistors R1, R2 divide the output voltage Vo at a ratio between their resistance values. The thus-divided voltage is input, as an input signal IN, to a negative input terminal of an error amplifier 118a within the control circuit 112.

The error amplifier 118a has first and second positive input terminals. The error amplifier 118a outputs a voltage corresponding to a difference between a lower one of the voltages input to the positive input terminals and the voltage input to the negative input terminal. More specifically, if the lower one of the voltage of the positive input terminals is greater than the voltage of the negative input terminal, the output voltage increases. In contrast, if the lower one of the voltages of the positive input terminals is smaller than the voltage of the negative input terminal, the output voltage decreases.

The first positive input terminal of the error amplifier 118a is connected to a changeover circuit 119 and to the ground GND via a external capacitor 120.

On the basis of the signal output from an input circuit 131 (described below), the changeover circuit 119 connects the capacitor 120 to either a contact "a" or "b" via a movable contact 119a. A current source 121 which supplies a constant current I is connected to the contact "a," and the contact "b" is connected to the ground GND via a resistor R3. When the movable contact 119a of the changeover circuit 119 is connected to the contact point "a," the capacitor 120 is charged by the constant current I supplied from the current source 121 and when the movable contact 119a is connected to the contact point "b," the charge stored in the capacitor 120 is discharged to the ground GND via the resistor R3.

The charge/discharge voltage of the capacitor 120 is input as an input signal CS to the first positive input terminal of the error amplifier 118a. The current source 121, the changeover circuit 119, and the capacitor 120 form a gentle start-up circuit, which gently increases the input signal CS, with a time constant set by the constant current I and the capacitance 120, when the movable contact 119a is switched to the contact "a."

The second positive input terminal of the error difference amplifier 118a receives a reference voltage Vref1. The reference voltage Vref1 is lower in electric potential than the source voltage Vcc and is set to a voltage determined by division of a desired output voltage Vo by means of the resistors R1, R2.

The signal output from the error amplifier 118a is input to the positive input terminals of first and second PWM comparators 122a, 123a. A triangular wave having a given frequency is input to the negative input terminals of the first and second PWM comparators 122a, 123a from an oscillator 124. The first and second PWM comparators 122a, 123a are activated by means of a bias voltage VB received from a bias voltage generation circuit 125. A reference voltage generation circuit (not shown) receives the bias voltage VB and generates the reference voltage Vref1.

The first PWM comparator 122a compares the voltage input to the negative input terminal with the voltage input to the positive input terminal. If the voltage input to the positive input terminal is greater than the voltage input to the negative input terminal, the first PWM comparator 122a outputs a signal high to a first output circuit 126.

The second PWM comparator 123a compares the voltage input to the negative input terminal with the voltage input to the positive input terminal. If the voltage input to the positive input terminal is greater than the voltage input to the negative input terminal, the second PWM comparator 123a outputs a signal high to the second output circuit 127.

The output signal from the first PWM comparator 122a is buffered in the first output circuit 126, and the thus-buffered output signal OUT1 is output to the gate of the output transistor 113. The signal output from the second PWM comparator 123a is buffered and inverted by the second output circuit 127, and the thus-buffered and inverted signal OUT2 is output to the gate of the synchronous rectifying transistor 114.

The output signal OUT1 is a pulse signal which is identical in frequency to the signal output from the oscillator 124. The time period over which the output signal OUT1 goes high becomes longer as the level of the voltage output from the error amplifier 118a increases.

The output signal OUT2 is also a pulse signal which is identical in frequency to the signal output from the oscillator 124. The time period over which the output signal OUT2 goes low becomes longer as the level of the voltage output from the error amplifier 118a increases. Thus the output signal OUT2 is an inverted signal of the output signal OUT1.

In order to prevent a through current from flowing from the power source Vcc to the ground GND via the output transistor 113 and the synchronous rectifying transistor 114, it is desired that the output signal OUT2 is high in a period in which the output signal OUT1 is low. For example, to achieve this goal, the signal output from the error amplifier 118a and input to the positive input terminal of the second PWM comparator 123a, may be dropped by a predetermined amount.

The signal CS is input to the negative input terminal of a comparator 128, and the positive input terminal of the comparator 128 receives e.g., a voltage as low as about 50 mV, as a reference voltage Vref2. When the input signal CS is decreased to a value smaller than the reference voltage Vref2, the comparator 128 outputs a signal high. In contrast, when the input signal CS is increased to a value greater than the reference voltage Vref2, the comparator 128 outputs a signal low.

The signal output from the comparator 128 is inverted by an inverter circuit 129, and the thus-inverted signal is fed to an OR circuit 130. The inverter circuit 129 operates on the bias voltage VB received from the bias voltage generation circuit 125. The comparator 128, the inverter circuit 129, and the OR circuit 130 form a bias maintenance circuit.

The input circuit 131 receives a control signal CTL from an external device. When the control signal CTL goes high, the input circuit 131 outputs a signal high to the OR circuit 130 and the changeover circuit 119. When the control signal CTL is low, the input circuit 131 outputs a signal low.

When the signal output from the input circuit 131 goes high, the changeover circuit 119 connects the capacitor 120 to the current source 121, and when the signal output from the input circuit 131 goes low, the capacitor 120 is connected to the resistor R3.

By reference to FIG. 8, the operation of the DC—DC converter 111 will be described.

When the control signal CTL goes high, the signal output from the input circuit 131 goes high, and the signal output from the OR circuit 130 goes high. As a result, the bias voltage VB is supplied to each of the semiconductor integrated circuit devices from the bias voltage generation circuit 125. Further, the reference voltage Vref1 is supplied to the error amplifier 118a, and the reference voltage Vref2 is supplied to the comparator 128. The changeover circuit 119 connects the current source 121 to the capacitor 120. The voltage level of the signal CS input to the error amplifier 118a is gradually increased by means of the time constant defined by the current source 121 and the capacitor 120. Even if the input signal IN is low (ground GND), the error amplifier 118a operates on the basis of the result of the comparison between the input signal IN and the input signal CS. Since the input signal CS is gradually increased, the output signal Vo is prevented from sharply increasing. Hence, the time period over which the output transistor 113 is in an on state is prevented from becoming considerably longer than the time period over which the output transistor 113 is in an off state.

Figure 8:
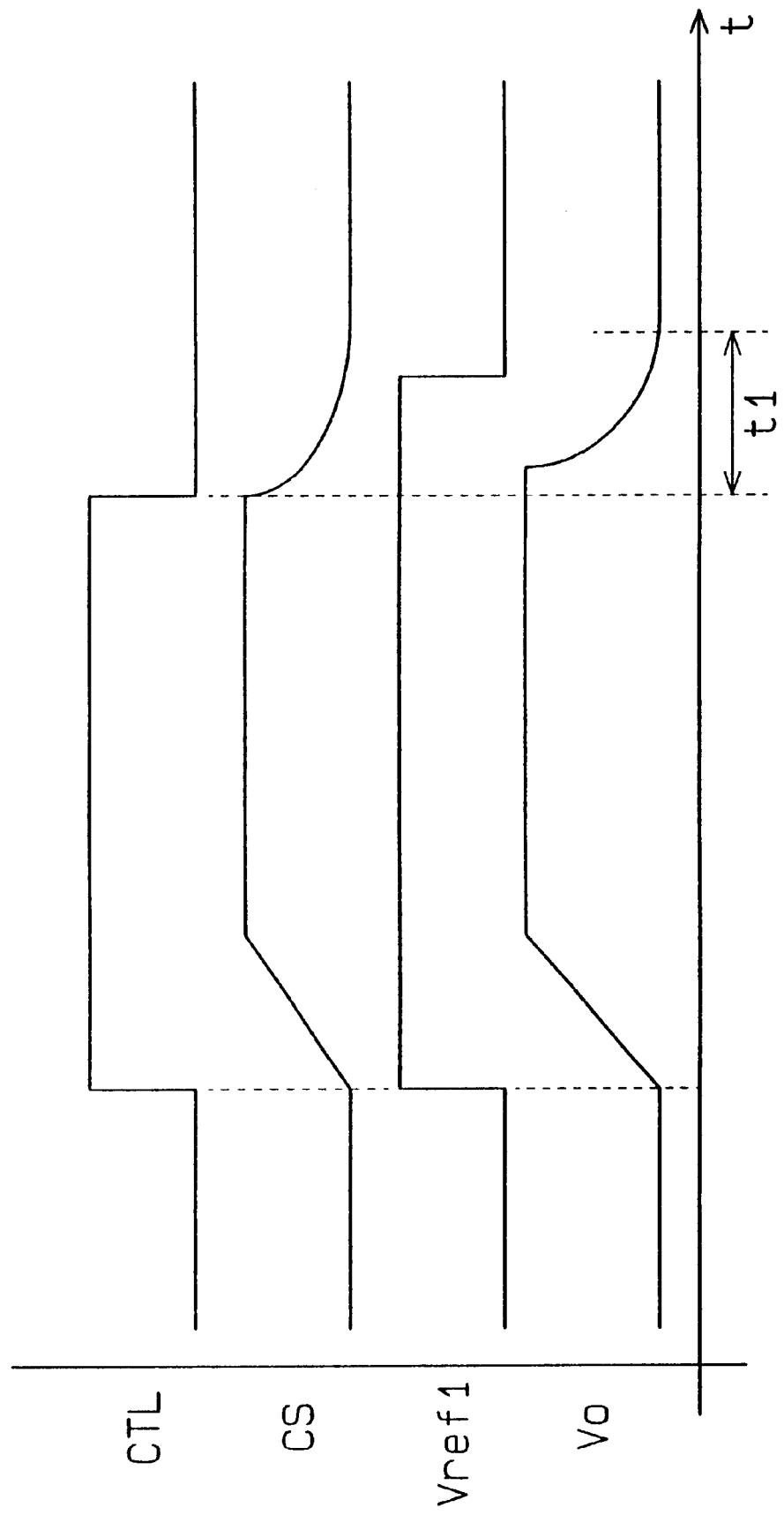
FIG. 8 is a waveform diagram showing the operation of the DC—DC converter according to the first embodiment.

As shown in FIG. 8, the output signal Vo gradually increases with an increase in the input signal CS regardless of the power supply voltage Vcc and the load connected to the output terminal To. Accordingly, there is prevented an adverse effect on the load circuit otherwise caused by a sharp increase in the output voltage Vo occurring at the time of the leading edge of the control signal CTL.

If the input signal CS exceeds the reference voltage Vref1, the output voltage Vo becomes constant. In other words, the error amplifier 118a outputs a signal on the basis of the potential difference between the input signal IN and the reference voltage Vref1. The first and second PWM comparators 122a, 123a compare the output signal with the reference voltage Vref1. On the basis of the signals output from the first and second PWM comparators 122a, 123a, the first and second output circuits 126, 127 output pulse signals as the output signals OUT1, OUT2.

On the basis of the signal OUT1, the output transistor 113 performs a switching operation. An electric current output as a result of the switching operation of the output transistor 113 is smoothed by means of the output coil 115 and the capacitor 117. When the output transistor 113 is turned off, the output voltage Vo is smoothed by means of the electric current supplied to the output coil 115 from the capacitor 117 via the flywheel diode 116.

When the output transistor 113 is turned off, the synchronous rectifying transistor 114 is turned on by means of the signal OUT2. The forward voltage drop of the flywheel diode 116 is decreased to substantially zero, thereby improving smoothing efficiency.

Through the foregoing operations, if the signal IN input to the error amplifier 118a is smaller than the reference voltage Vref1, the output voltage from the error amplifier 118a is increased, and the time period over which the signal OUT1 is in a high state is increased. As a result, the time period over which the output transistor 113 is in an on state becomes longer, thereby resulting in an increase in the output voltage Vo.

If the voltage level of the signal IN input to the error amplifier 118a is higher than the reference voltage Vref1, the voltage output from the error amplifier 118a is decreased, and the time period over which the signal OUT1 is in a high state is decreased. As a result, the time period over which the output transistor 113 is turned on becomes shorter, thereby resulting in a decrease in the output voltage Vo.

Through the foregoing operation, the output voltage Vo converges such that the voltage of the signal IN input to the error amplifier 118a matches the reference voltage Vref1, thereby resulting in a constant voltage.

In a state in which the output voltage Vo is held at a constant voltage, if the control signal CTL goes low, the signal output from the input circuit 131 goes low. As a result of switching action of the changeover circuit 119, the capacitor 120 is connected to the resistor R3.

The charge stored in the capacitor 120 is discharged to the ground GND via the resistor R3, and the signal CS input to the error amplifier 118a is gradually decreased by means of the time constant defined between the capacitor 120 and the resistor R3. At this time, the comparator 128 outputs a signal low until the voltage of the input signal CS becomes lower than the reference voltage Vref2. Further, the inverter circuit 129 outputs a signal high, and the OR circuit 130 outputs a signal high.

Thus, the bias voltage generation circuit 125 outputs the bias voltage VB until the voltage of the input signal CS becomes lower the reference voltage Vref2. The reference voltage Vref1 is maintained at a given level on the basis of the bias voltage VB and is supplied to the error amplifier 118a.

In this state, when the voltage of the input signal Cs becomes lower than the reference voltage Vref1, the output voltage of the error amplifier 118a decreases, and the time period over which the output signal OUT1 is in a high state is decreased. Thus, the time period over which the output transistor 113 is turned on is decreased, and the time period over which the synchronous rectifying transistor 114 is turned on is increased, thereby resulting in a decrease in the output voltage Vo.

Although the voltage level of the input signal IN decreases with a reduction in the output voltage Vo, the input signal CS further decreases. In this manner, the signal OUT1 low is fixed, and the output voltage Vo goes low (ground GND).

When the control signal CTL goes low, the output voltage Vo is reduced to the ground GND under the control of the DC—DC converter 111 as the voltage of the input signal CS decreases. Therefore, a time t1 required for the output voltage Vo to drop to the ground GND from the constant voltage is substantially determined by the time constant defined by the capacitor 120 and the resistor R3.

The DC—DC converter 111 provides the following advantageous results.

(A) When the control signal CTL high is input to the DC—DC converter, the output voltage Vo is gradually increased by means of the gentle start-up circuit.

(B) If the control signal CTL high is maintained, the output voltage Vo remains constant as set by the reference voltage Vref1 and the resistors R1 and R2.

(C) When the control signal CTL goes low, the output voltage Vo is reduced to the ground GND without being affected by the load within a given period of time in accordance with the time constant defined by the capacitor 120 and the resistor R3.

(D) A gentle stop circuit is provided by the resistor R3 and the changeover circuit 119 using the capacitor 120.

(E) Since the output voltage Vo is reduced within a given period of time by controlling the electric discharge of the capacitor 117 through use of the output transistor 113, there is no need to connect a new element for such discharge control.

Second Embodiment

Figure 9:
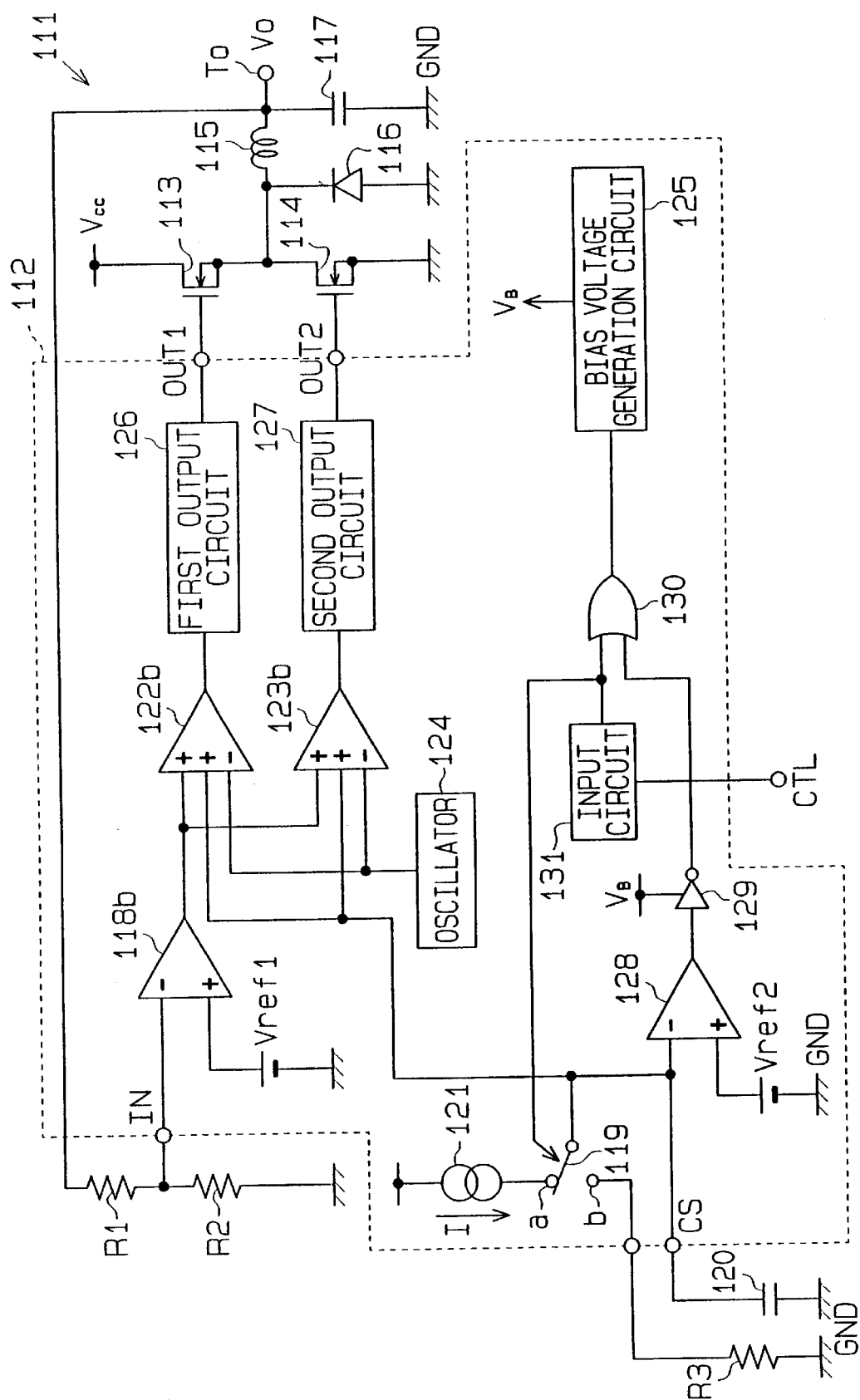
FIG. 9 is a circuit diagram showing a DC—DC converter according to a second embodiment of the present invention.

FIG. 9 shows a DC—DC converter in accordance with a second embodiment of the present invention. In the second embodiment, the input signal CS is input to the positive input terminals of first and second PWM comparators 122b, 123b. More specifically, only the reference voltage Vref1 is input to the positive input terminal of an error amplifier 118b, and a signal output from the error amplifier 118b is input to first positive input terminals of the first and second PWM comparators 122b, 123b. As in the first embodiment, a triangular wave having a predetermined frequency is input to the negative terminals of the first and second PWM comparators 122b, 123b.

Each of the first and second PWM comparators 122b, 123b compares a lower one of the voltages input to the first and second positive input terminals with the voltage input to the negative input terminal.

When the control signal CTL goes from low to high, the capacitor 120 is connected to the current source 121 via the changeover circuit 119, and the capacitor 120 is charged. As a result, the voltage level of the input signal CS is gradually increased from the ground GND. Since the output voltage Vo is at the ground GND at this time, the output voltage of the error amplifier 118b is increased, so that the first and second PWM comparators 122b, 123b compare the oscillator 124 generated signal with the input signal CS. As a result, the time period of the signal output high from the first PWM comparator 122b is gradually increased, and the time period of the signal output high from the second PWM comparator 123b is gradually decreased, thereby resulting in a gradual increase in the output voltage Vo. Accordingly, the gentle start-up operation analogous to that effected in the first embodiment is achieved.

When the voltage of the input signal CS becomes higher than the output voltage of the error amplifier 118b, each of the first and second PWM comparators 122b, 123b outputs a signal corresponding to the result of the comparison of the signal output from the error amplifier 118b with the signal output from the oscillator 124. As in the first embodiment, the output voltage Vo becomes a constant voltage set by the reference voltage Vref1 and the resistors R1, R2.

If the control signal CTL goes low while the constant output voltage Vo is output, the capacitor 120 is connected to the resistor R3 via the changeover circuit 119, thereby discharging the capacitor 120 via the resistor R3. As a result, the voltage level of the input signal CS decreases on the basis of the time constant defined by the capacitor 120 and the resistor R3, and each of the first and second PWM comparators 122b, 123b outputs a signal corresponding to the result of the comparison of the input signal CS with the signal output from the oscillator 124.

The time period of the signal OUT1 high is reduced, whereas the time period of the signal OUT2 high is increased, and the output voltage Vo is decreased. Accordingly, the DC—DC converter of the second embodiment operates in the same manner as does in the first embodiment and yields advantageous results analogous to that of the first embodiment.

Third Embodiment

Figure 10:
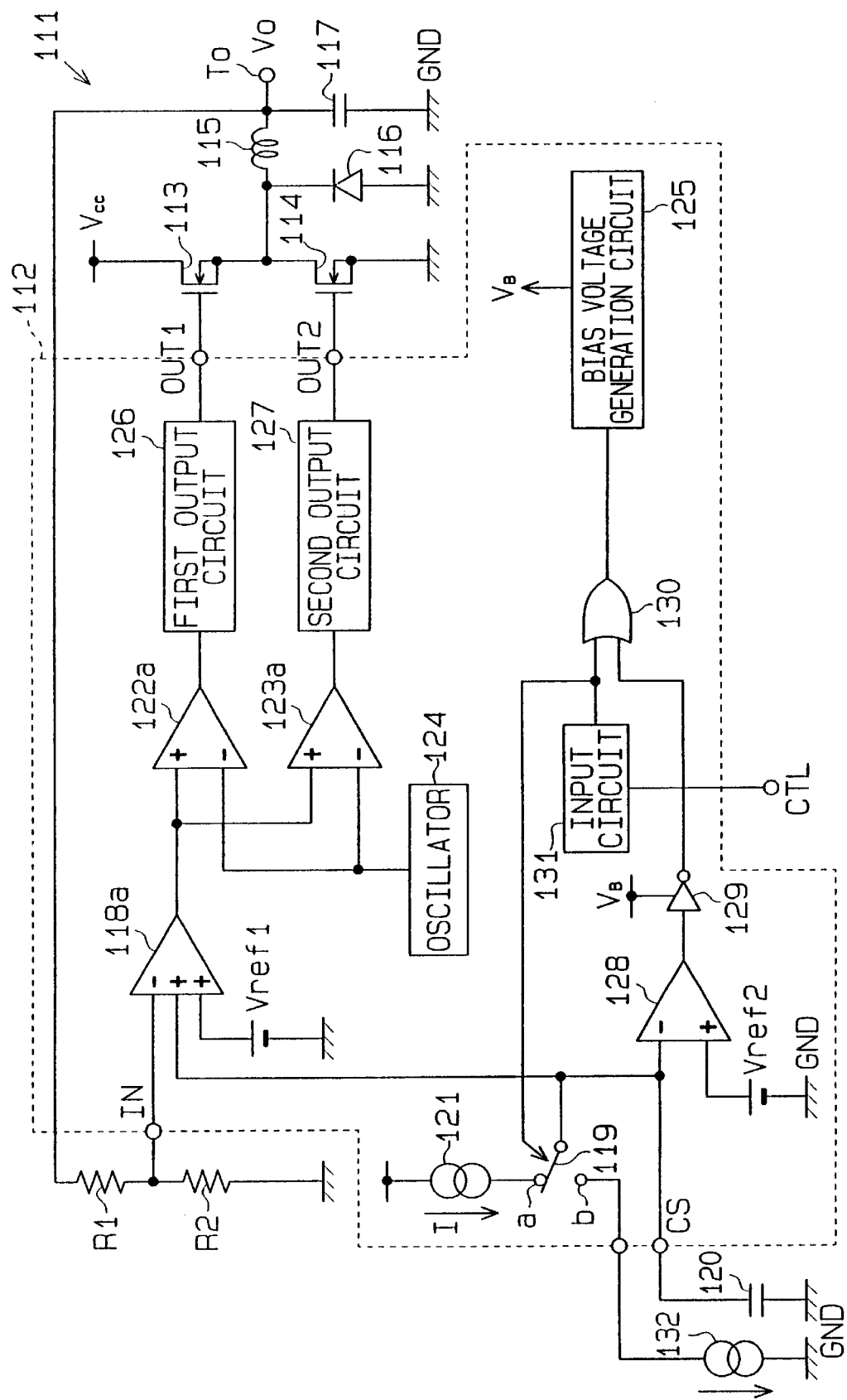
FIG. 10 is a circuit diagram showing a DC—DC converter according to a third embodiment of the present invention.

FIG. 10 shows a DC—DC converter in accordance with a third embodiment of the present invention. In the third embodiment, the resistor R3 employed in the first embodiment is replaced with a current source 132. In other respects, the DC—DC converter according to the third embodiment is the same as the DC—DC converter according to the first embodiment.

In the third embodiment, the current discharged from the capacitor 120 is held at a constant level irrespective of the charge voltage. Hence, the voltage level of the input signal CS is linearly decreased when the capacitor 120 is discharged. Accordingly, in addition to the operation and advantageous results accomplished in the first embodiment, when the control signal CTL goes low, the output voltage Vo is linearly decreased.

Although the present invention is embodied in the form of a control circuit for controlling the output voltage Vo of the DC—DC converter in any of the aforementioned embodiments, a discharge control circuit according to the present invention may be used for controlling the electric current output from the output transistor.

Figure 11:
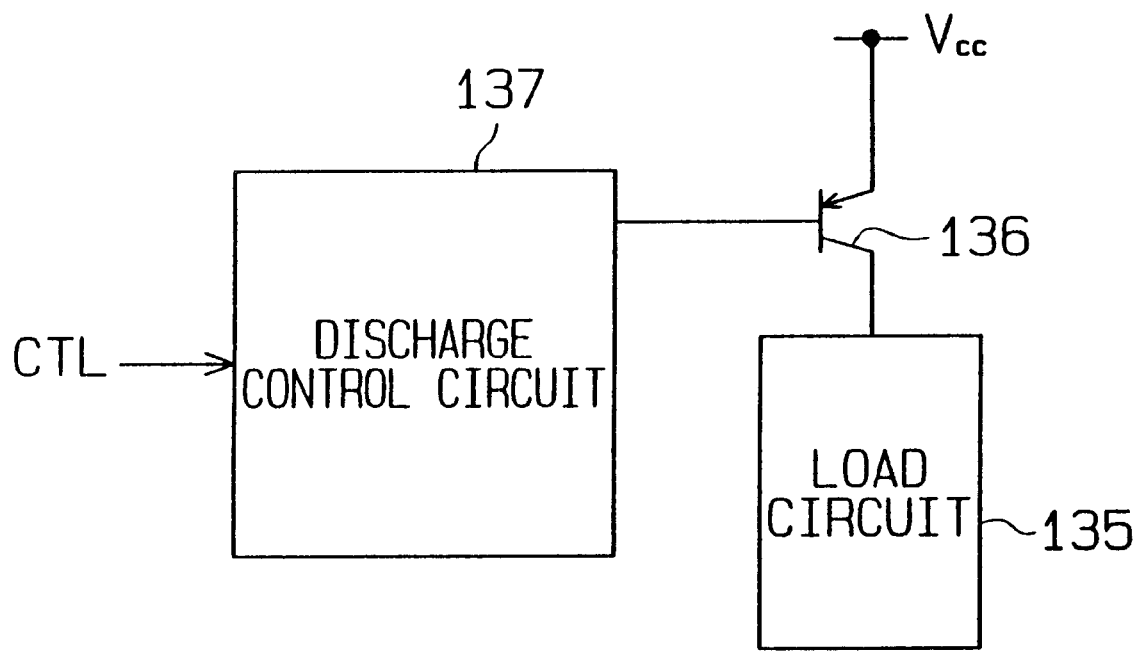
FIG. 11 is a circuit diagram showing an example of the use of a discharge control circuit.

For example, as shown in FIG. 11, a transistor 136 which operates as a series regulator for supplying a power source voltage Vcc to a load circuit 135 is controlled by means of a discharge control circuit 137 according to the present invention. The transistor 136 may comprise an NPN transistor or a MOS transistor, as well as a PNP transistor.

With such a configuration, when the control signal CTL goes low, the time period over which the transistor 136 is turned on is gradually reduced, thereby enabling the discharge control circuit 137 to control the trailing edge of the source voltage supplied to the load circuit 135.

Fourth Embodiment

Figure 1:
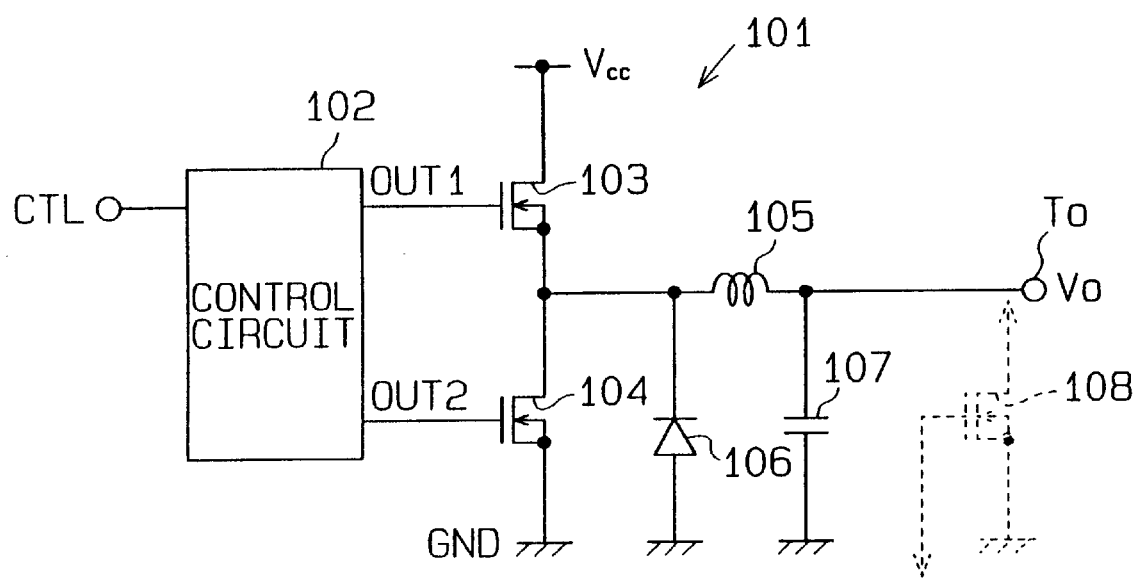
FIG. 1 is a circuit diagram showing a conventional DC—DC converter.
Figure 2:
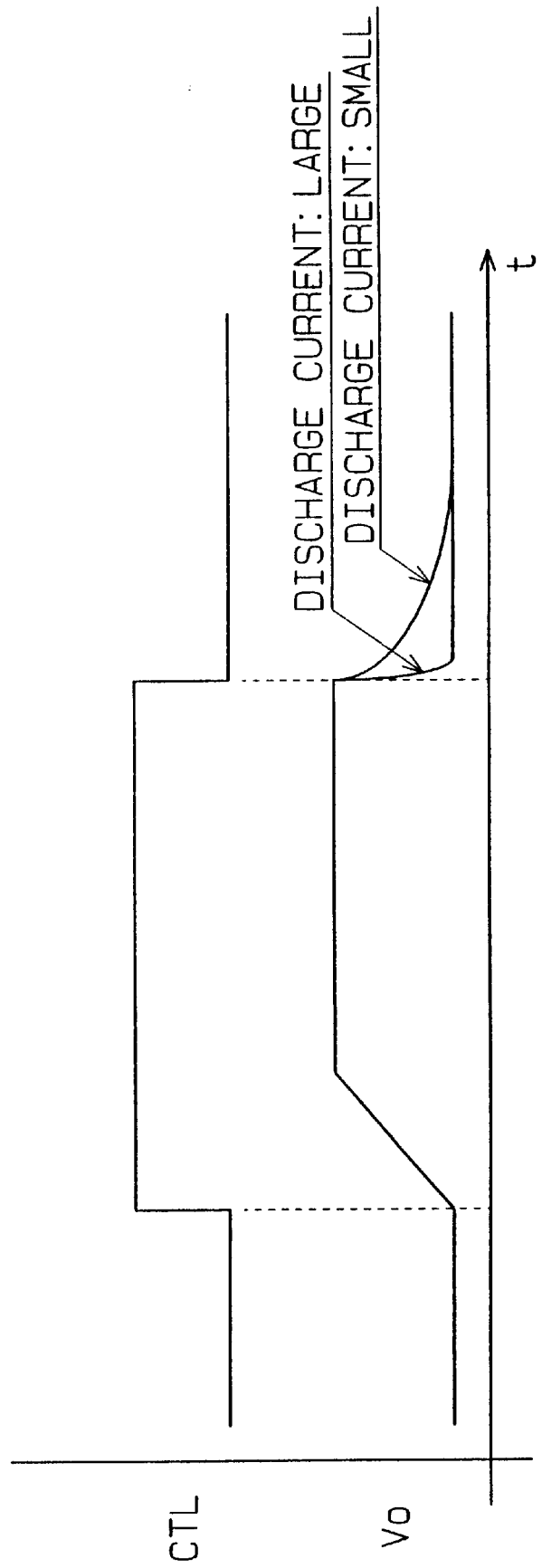
FIG. 2 is a waveform diagram showing the operation of the conventional DC—DC converter of FIG. 1.
Figure 3:
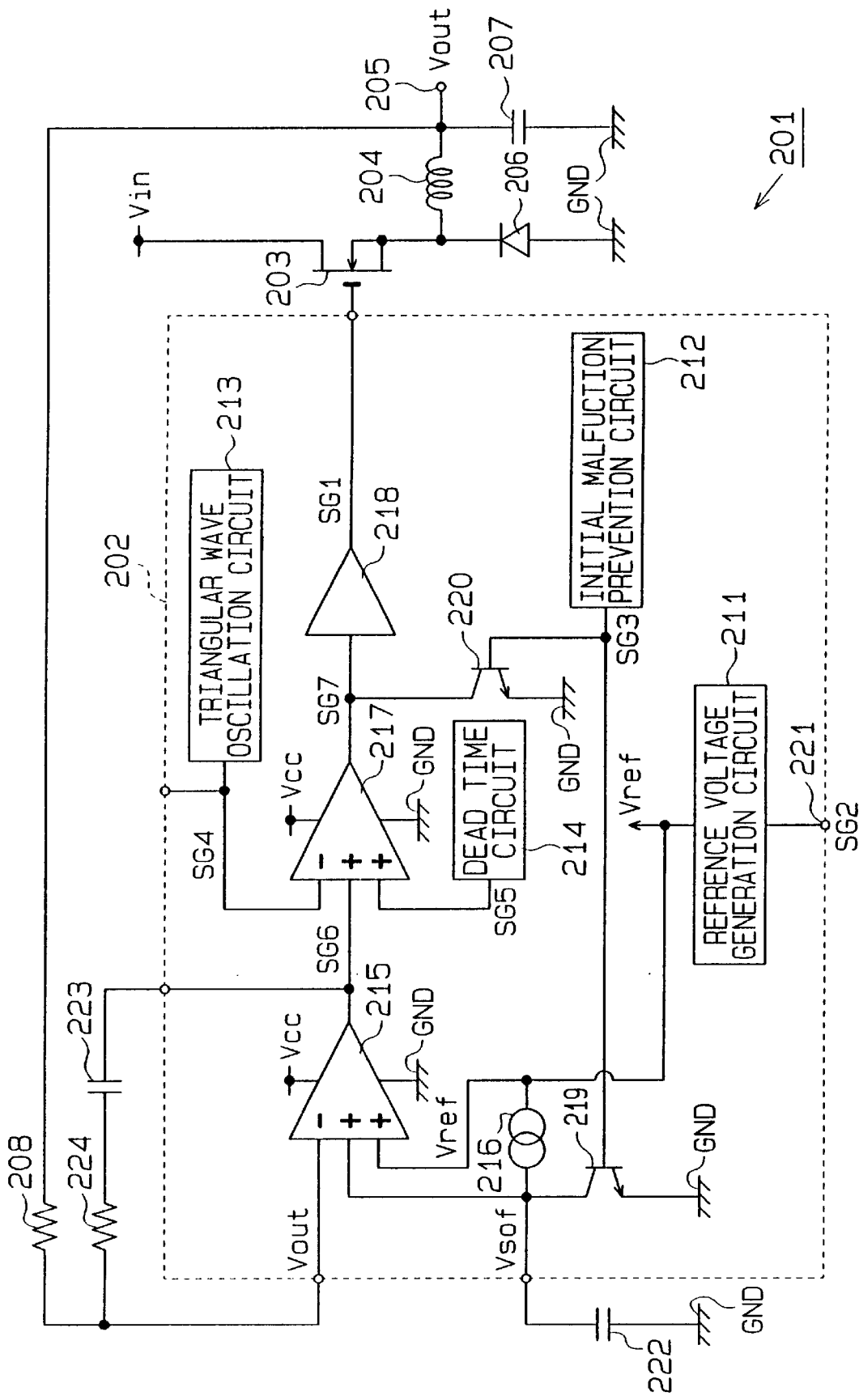
FIG. 3 is a more detailed circuit diagram showing a conventional DC—DC converter.
Figure 4:
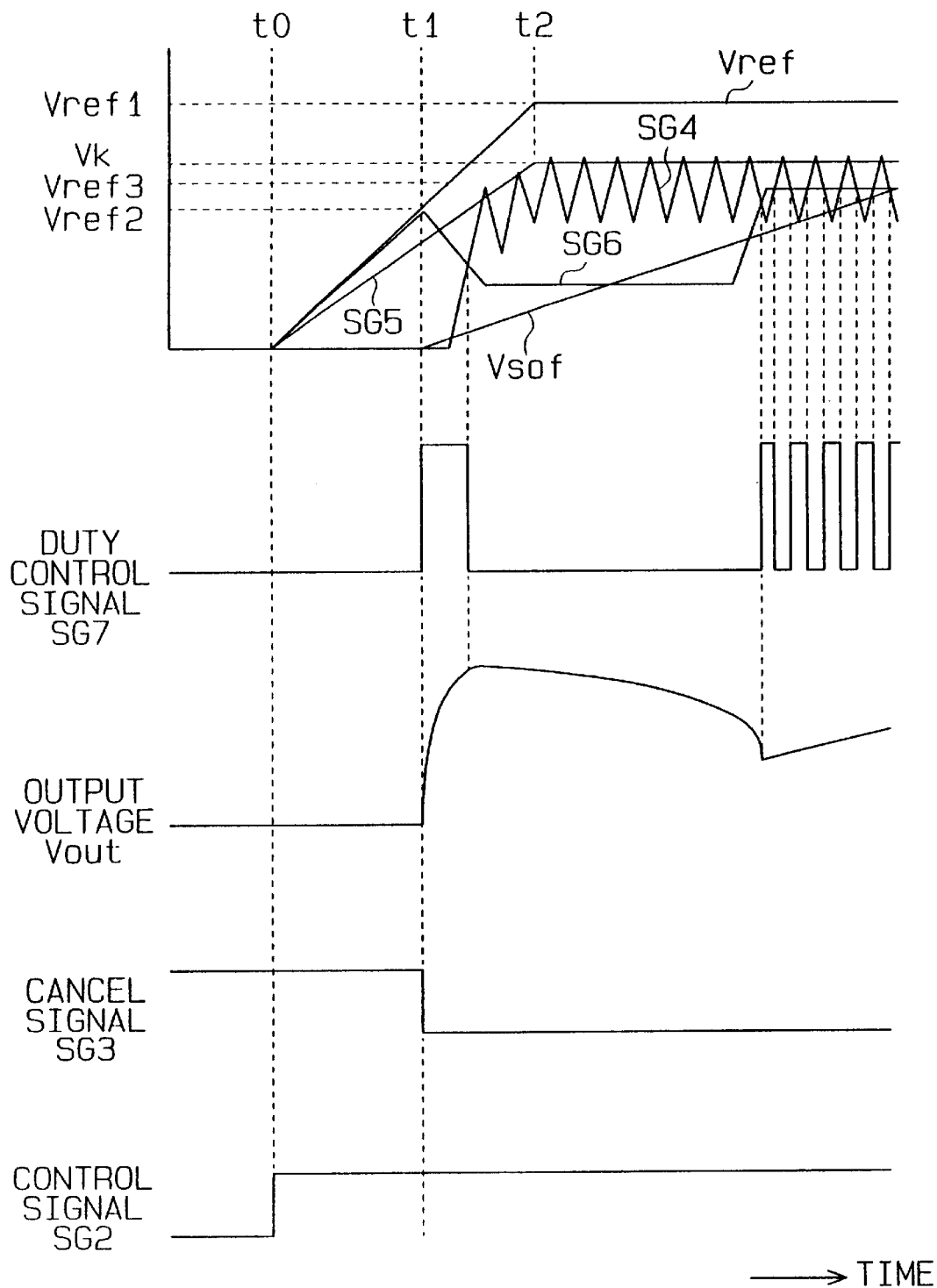
FIG. 4 is a waveform diagram explaining the operation of the conventional DC—DC converter of FIG. 3.
Figure 12:
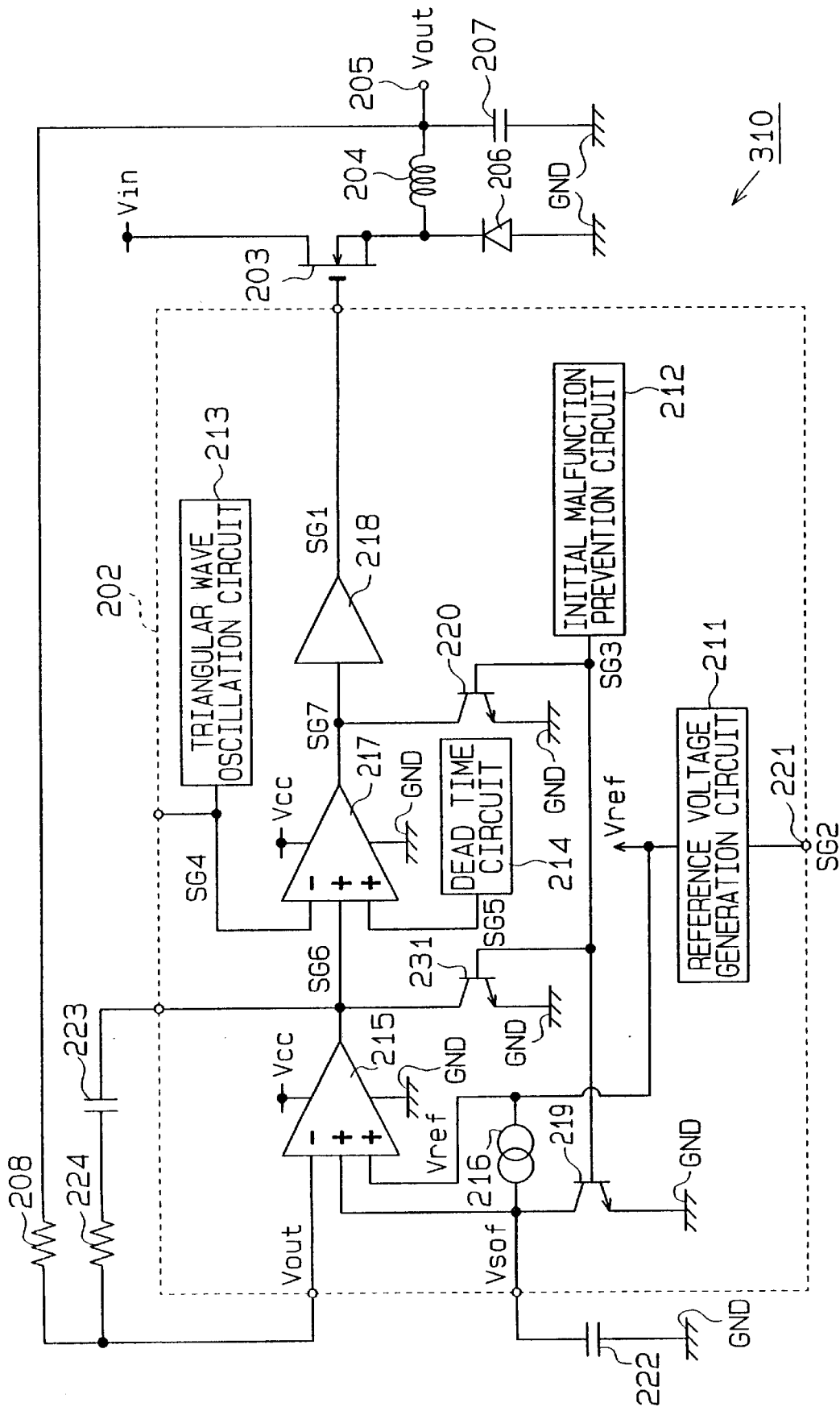
FIG. 12 is a circuit diagram showing a DC—DC converter in accordance with a fourth embodiment of the present invention.

FIG. 12 shows a DC—DC converter 310 in accordance with a fourth embodiment. The fourth embodiment is directed to application of the present invention to the conventional DC—DC converter 201 shown in FIG. 3.

The embodiment is characterized by connection of a fourth short-circuit transistor 231 comprising a bipolar transistor connected between an output terminal of the error amplification circuit 215 and the ground GND. In more detail, the collector of the short-circuit transistor 231 is connected to an output terminal of the error amplification circuit 215, and the emitter of the short-circuit transistor 231 is connected to the ground GND. The base of the short-circuit transistor 231 receives a cancel signal SG3 from the initial malfunction prevention circuit 212. The short-circuit transistor 231 is turned on when the cancel signal SG3 is high and is turned off when the cancel signal SG3 is low.

In the fourth embodiment, the timing at which the cancel signal SG3 goes low is set to lag behind the timing of the conventional DC—DC converter. That is, the timing is controlled within the initial malfunction prevention circuit 212 such that the cancel signal SG3 goes low after the triangular wave oscillation circuit 213 has commenced normal oscillation.

The initial malfunction prevention circuit 212 receives the reference voltage Vref as the bias voltage. When the reference voltage Vref, which is in the course of increasing to the specified voltage Vref1, reaches the specified voltage Vref2, the initial malfunction prevention circuit 212 determines that a bias voltage which enables the initial malfunction prevention circuit 212 to operate is attained, and outputs the cancel signal SG3 low. In the fourth embodiment, the reference voltage Vref supplied to the initial malfunction prevention circuit 212 is divided by a voltage dividing circuit provided in the initial malfunction prevention circuit 212. The thus-divided voltage is used as a bias voltage. When the divided voltage reaches the bias voltage (=Vref2), the cancel signal SG3 low is produced. That is, the time required for the divided voltage to reach the bias voltage which enables the initial malfunction prevention circuit 212 to operate is extended by an amount of time corresponding to the ratio of division of the reference voltage Vref, thereby delaying the timing at which the cancel signal SG3 goes low when compared with that used in the conventional DC—DC converter.

In the fourth embodiment, the reference voltage Vref or the bias voltage (=Vref2) is set to become higher than the voltage Vref3 at which the triangular wave oscillation circuit 213 starts oscillation. Accordingly, after the triangular wave oscillation circuit 213 has commenced oscillation, the cancel signal SG3 goes low. Preferably, the short-circuit transistor 231 and the initial malfunction prevention circuit 212 comprise a hold circuit.

The operation of the DC—DC converter 310 will now be described. When the control signal SG2 input to the reference voltage generation circuit 211 from an external device is low while the drive source voltage Vcc is supplied to each of the circuits 211 to 213, 215, 217, and 218, the DC—DC converter 310 is in a suspended state.

Accordingly, the reference voltage Vref of the reference voltage generation circuit 211 is zero volts. As a result, the error amplification circuit 215, the PWM comparator circuit 217, and the output circuit 218 are also in a suspended state. In addition, the triangular wave oscillation circuit 213 and the dead time circuit 214 are also in a suspended state.

The reference voltage Vref of zero volts is supplied to the initial malfunction prevention circuit 212, and therefore the cancel signal SG3 high is output. Further, the first and second transistors 219, 220 and the short-circuit transistor 231 are in an on state. As a result, the voltage of an error output signal SG6 of the error amplification circuit 215 and the charge voltage Vsof of the capacitor 222 are zero volts. Further, the voltage of the duty control signal SG7 of the PWM comparison circuit 217 is also zero volts or low, and the voltage of the signal SG1 output from the output circuit 218 is also low. Consequently, the output transistor 203 is in an off state, and the output Vout is zero volts.

Figure 13:
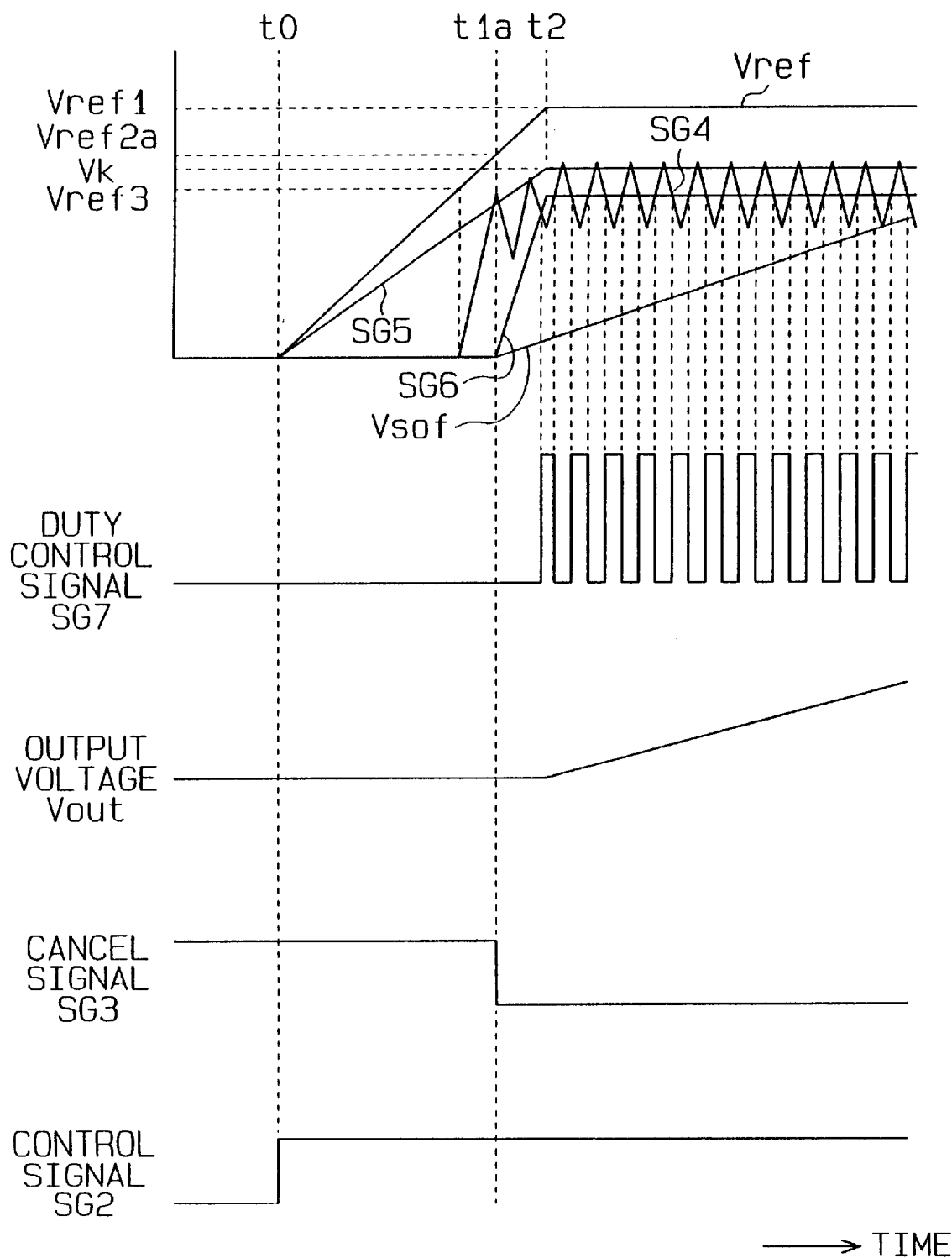
FIG. 13 is a waveform diagram explaining the operation of the DC—DC converter of FIG. 12.

If the control signal SG2 goes high at time t0 as shown in FIG. 13, the DC—DC converter 310 commences operation. In response to the control signal SG2 high, the reference voltage generation circuit 211 generates the reference voltage Vref on the basis of the drive source voltage Vcc. At this time, as shown in FIG. 13, the reference voltage Vref increases to the specified voltage Vref1 at a given rate. The gradually-increasing reference voltage Vref is supplied to the initial malfunction prevention circuit 212, the triangular wave oscillation circuit 213, the dead time circuit 214, the first noninverting input terminal of the error amplification circuit 215, and the constant current circuit 216. Since the bias voltage has not yet reached the voltage which enables the initial malfunction prevention circuit 212 to operate at this time, the cancel signal SG3 high is still maintained.

The error amplification circuit 215, the PWM comparison circuit 217, and the output circuit 218 shift to an operative state on the basis of the increasing reference voltage Vref. Since the charge voltage Vsof supplied to the second noninverting input terminal of the error amplification circuit 215 is zero volts at that time, the error output signal SG6 from the error amplification circuit 215 attempts to increase at the same rate as the reference voltage Vref. However, the short-circuit transistor 231 is in an on state, and therefore the voltage of the error output signal SG6 is retained at zero volts. The dead time circuit 214 supplies the limit signal SG5 proportional to the reference voltage Vref to the PWM comparison circuit 217.

Accordingly, the PWM comparison circuit 217 compares the error output signal SG6 retained at zero volts with the triangular wave SG4 of the triangular wave oscillation circuit 213. The triangular wave oscillation circuit 213 has not yet commenced oscillation at this time, and the triangular wave signal SG4 is zero volts. The PWM comparison circuit 217 eventually outputs the duty control signal SG7 low. Further, since the second transistor 220 is in an on state, the duty control signal SG7 low is reliably retained. Accordingly, the signal SG1 low is still maintained, and therefore the output transistor 203 is also held in an off state.

In due time, as shown in FIG. 13, the triangular wave oscillation circuit 213 commences oscillation and outputs the triangular wave signal SG4 to the PWM comparison circuit 217. That is, the level of the triangular wave signal SG4 crosses the level of the limit signal SG5. However, the short-circuit transistor 231 still remains in an on state, so the error output signal SG6 is retained at zero volts. Accordingly, the PWM comparison circuit 217 continues to output the duty control signal SG7 low.

At time t1a, the cancel signal SG3 from the initial malfunction prevention circuit 212 goes low, and the first and second transistors 219, 220 and the short-circuit transistor 231 are turned off. The capacitor 222 commences charging operation, and the charge voltage Vsof is supplied to the second noninverting input terminal of the error amplification circuit 215. Since the charge voltage Vsof is lower than the reference voltage Vref, the error amplification circuit 215 compares the output voltage Vout with the charge voltage Vsof and amplifies the potential difference. The amplified potential difference is output to the PWM comparison circuit 217 as the error output signal SG6. After time t1a, the charge voltage Vsof gradually increases, and hence the output voltage SG6 of the error amplification circuit 215 is increased to such an extent as to enter the range of amplitude of the triangular wave signal SG4 which causes the output voltage Vout to follow the charge voltage Vsof.

Therefore, the duty control signal SG7 of the PWM comparison circuit 217 is low until the output voltage SG6 enters and, for the first time, crosses the range of amplitude of the triangular wave signal SG4. Hence, the output transistor 203 still remains in an off state.

When the error output signal SG6 reaches the range of amplitude of the triangular wave signal SG4, the PWM comparison circuit 217 outputs the duty control signal SG7, which goes high when the error output signal SG6 is greater than the triangular wave signal SG4, and goes low when the error output signal SG6 is smaller than the triangular wave signal SG4.

Next, the DC—DC converter 201 performs gentle power-up operation; namely, the DC—DC converter 201 controls the output voltage Vout so that it follows the increasing charge voltage Vsof. When the charge voltage Vsof reaches the specified voltage Vref1, the DC—DC converter 201 controls the output voltage Vout such that it is maintained at the reference voltage Vref; i.e., the specified voltage Vref1.

At the time of gentle start-up operation, the PWM comparison circuit 217 produces the duty control signal SG7 on the basis of the triangular wave signal SG3 from the triangular wave oscillation circuit 213, as well as of the error output signal SG6 from the error amplification circuit 215. As a result, temporal flow of an excess electric current to the output transistor 203 before the triangular wave oscillation circuit 213 commences oscillation is prevented. Consequently, the output transistor 203 is prevented from deteriorating.

If the cancel signal SG3 goes low, the voltage control based on the charge voltage Vsof and the output voltage Vout (i.e., gentle start-up operation), is executed immediately. Therefore, the stable voltage Vout is supplied to each of the semiconductor integrated circuit devices as operational power, so that faulty operations of the semiconductor integrated circuit devices stemming from supply of operational power are reduced.

The error output signal SG6 from the error amplification circuit 215 is retained at zero volts by the short-circuit transistor 231, thereby preventing the output of the duty control signal SG7 high from the PWM comparison circuit 217 due to the receipt of an uncertain input signal, which occurs in the conventional DC—DC converter.

According to the present invention, the short-circuit transistor 231 may be omitted if the initial malfunction prevention circuit 212 is configured to provide the cancel signal SG3 low to the first and second transistors 219, 220 after the triangular wave oscillation circuit 213 commences an oscillation operation. In other words, the error amplification circuit 215 continues to output the error output signal SG6 corresponding to the reference voltage Vref until the cancel signal SG3 low is output. Then, the first and second transistors 219, 220 are not turned on until the triangular wave oscillation circuit 213 commences oscillation. Consequently, when the first and second transistors 219, 220 are turned on, the triangular wave signal SG4 has a substantially normal value. The error output signal SG6 from the error amplification circuit 215 reaches the range of amplitude of the triangular wave signal SG3 within a very short period of time, thereby enabling execution of gentle start-up operation within a short period of time.

Fifth Embodiment

Figure 14:
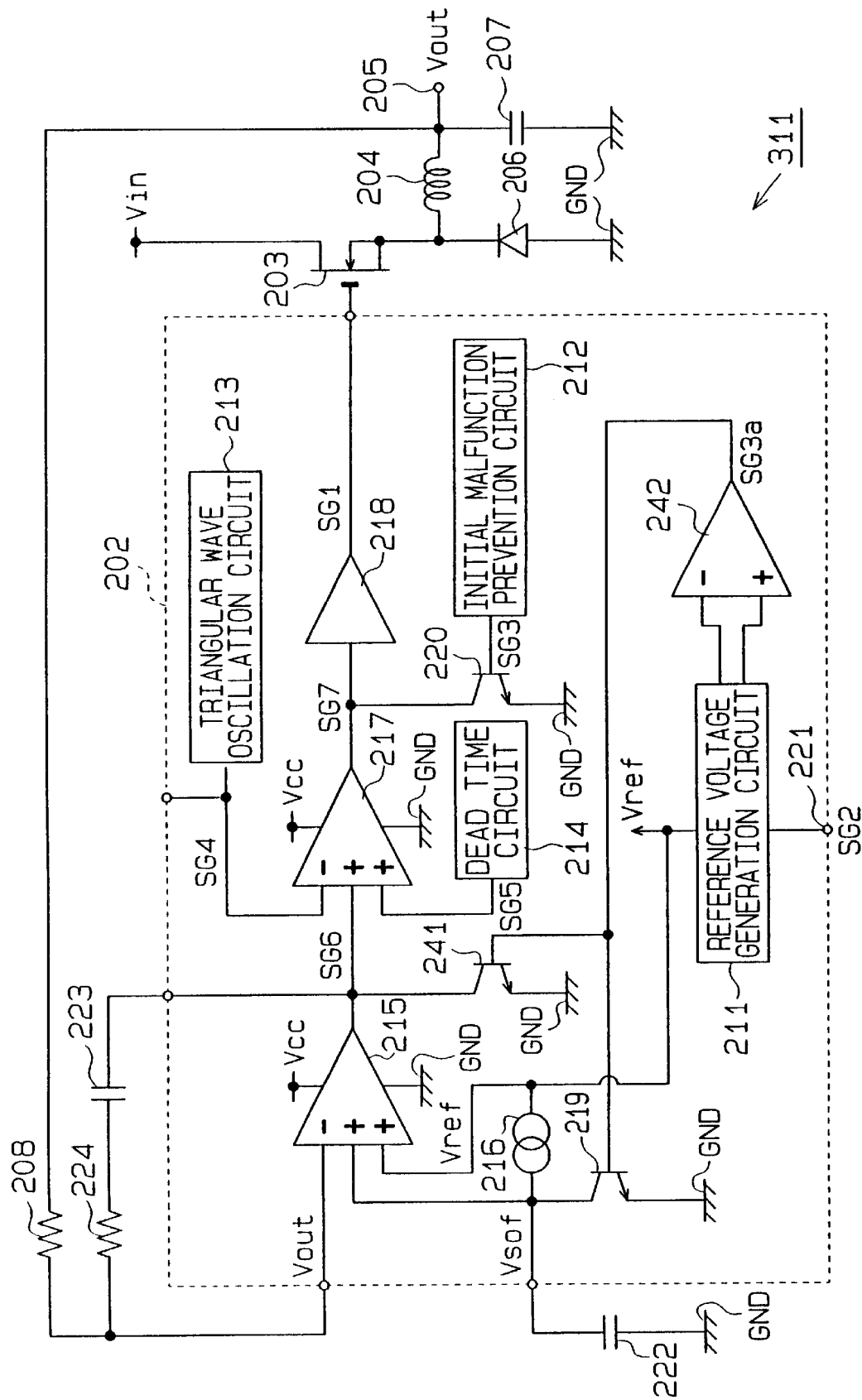
FIG. 14 is a circuit diagram showing a DC—DC converter in accordance with a fifth embodiment of the present invention.

FIG. 14 shows a DC—DC converter 311 in accordance with a fifth embodiment of the present invention. The present embodiment is directed to application of the present invention to the conventional DC—DC converter 201 shown in FIG. 3.

As shown in FIG. 14, DC—DC converter 311 is characterized by connection of a short-circuit transistor 241, which comprises a bipolar transistor and forms a stop circuit between the output terminal of the error amplification circuit 215 and the ground GND. In more detail, the collector of the short-circuit transistor 241 is connected to the output terminal of the error amplification circuit 215, and the emitter is connected to the ground GND. The base of the short-circuit transistor 241 receives a second cancel signal SG3a from a reference voltage determination circuit 242. The base of the first transistor 219 also receives the second cancel signal SG3a. As a result, when the second cancel signal SG3a is high, the short-circuit transistor 241 and the first transistor 219 are turned on. In contrast, when the second cancel signal SG3a is low, the short-circuit transistor 241 and the first transistor 219 are turned off.

Figure 5:
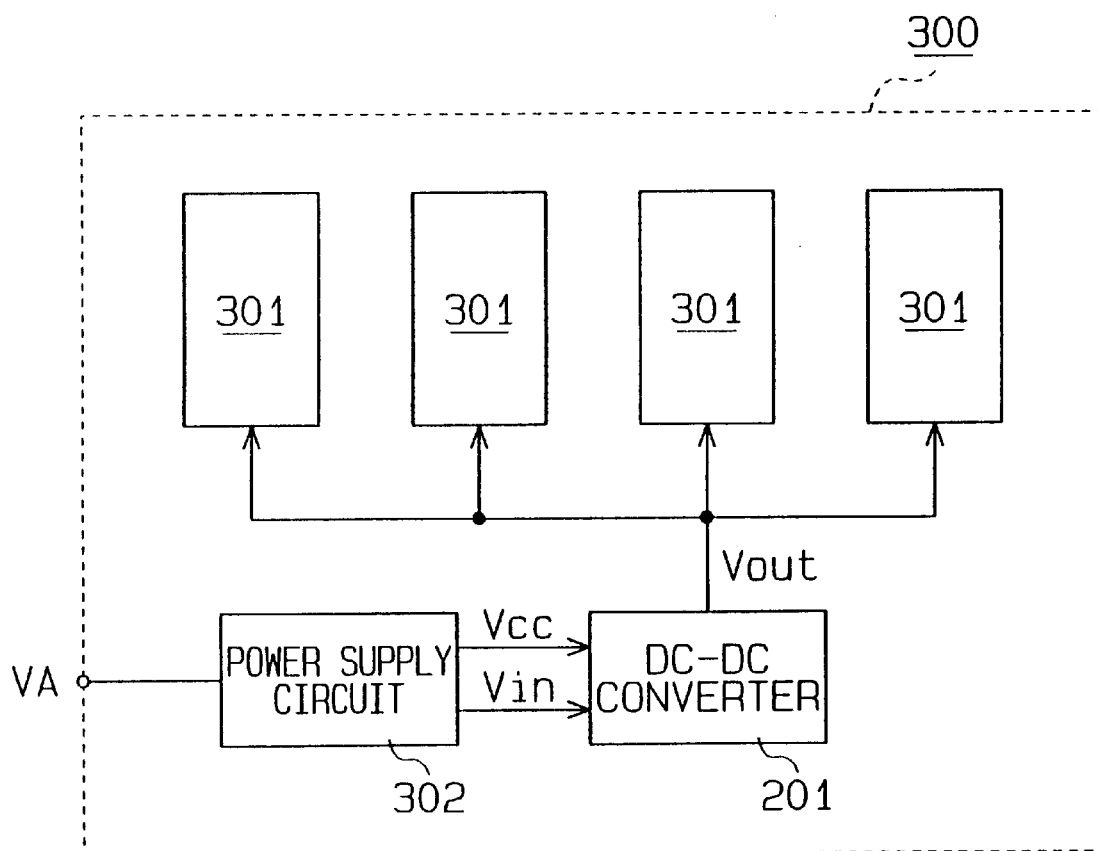
FIG. 5 is a block diagram of an operational power supply system for use with an electronic device.

The reference voltage determination circuit 242 comprises a comparator and receives the drive voltage Vcc from the power supply circuit 302 (FIG. 5). When the reference voltage Vref produced by the reference voltage generation circuit 211 reaches the specified voltage Vref1, the reference voltage determination circuit 242 outputs the second cancel signal SG3a low. Accordingly, the short-circuit transistor 241 and the first transistor 219 are turned on before the reference voltage Vref reaches the specified voltage Vref1 (i.e., before the triangular wave oscillation circuit 213 commences oscillation). When the reference voltage Vref reaches the specified voltage Vref1 (i.e., after the triangular oscillation circuit 213 has commenced oscillation), the short-circuit transistor 241 and the first transistor 219 are turned off.

The second transistor 220 receives the cancel signal SG3 from the initial malfunction prevention circuit 212. Therefore, in the fifth embodiment, the timing at which the cancel signal SG3 from the initial malfunction prevention circuit 212 goes low is faster the such timing in the first embodiment. More specifically, the cancel signal SG3 goes low before the triangular wave oscillation circuit 213 commences normal oscillation.

The operation of the DC—DC converter 311 will be described below. When the control signal SG2 low is input to the reference voltage generation circuit 211 while the drive source voltage Vcc is supplied to each of the circuits 211 to 213, 215, 217, 218, and 242 within the control circuit 202, the DC—DC converter 311 is in a suspended state. Accordingly, the reference voltage Vref of the reference voltage generation circuit 211 is zero volts. In addition, the dead time circuit 214 is also in a suspended state.

The reference voltage Vref of zero volts is supplied to the initial malfunction prevention circuit 212 and the voltage determination circuit 242, and therefore the cancel signal SG3 and the second cancel signal SG3a are high. Further, the first and second transistors 219, 220 and the short-circuit transistor 241 are in an on state. As a result, the voltage of the error output signal SG6 of the error amplification circuit 215 and the charge voltage Vsof of the capacitor 222 are zero volts. Further, the voltage of the duty control signal SG7 of the PWM comparison circuit 217 is also zero volts or low, and the voltage of the signal SG1 output from the output circuit 218 is low. Consequently, the output transistor 203 is in an off state, and the output Vout is zero volts.

Figure 15:
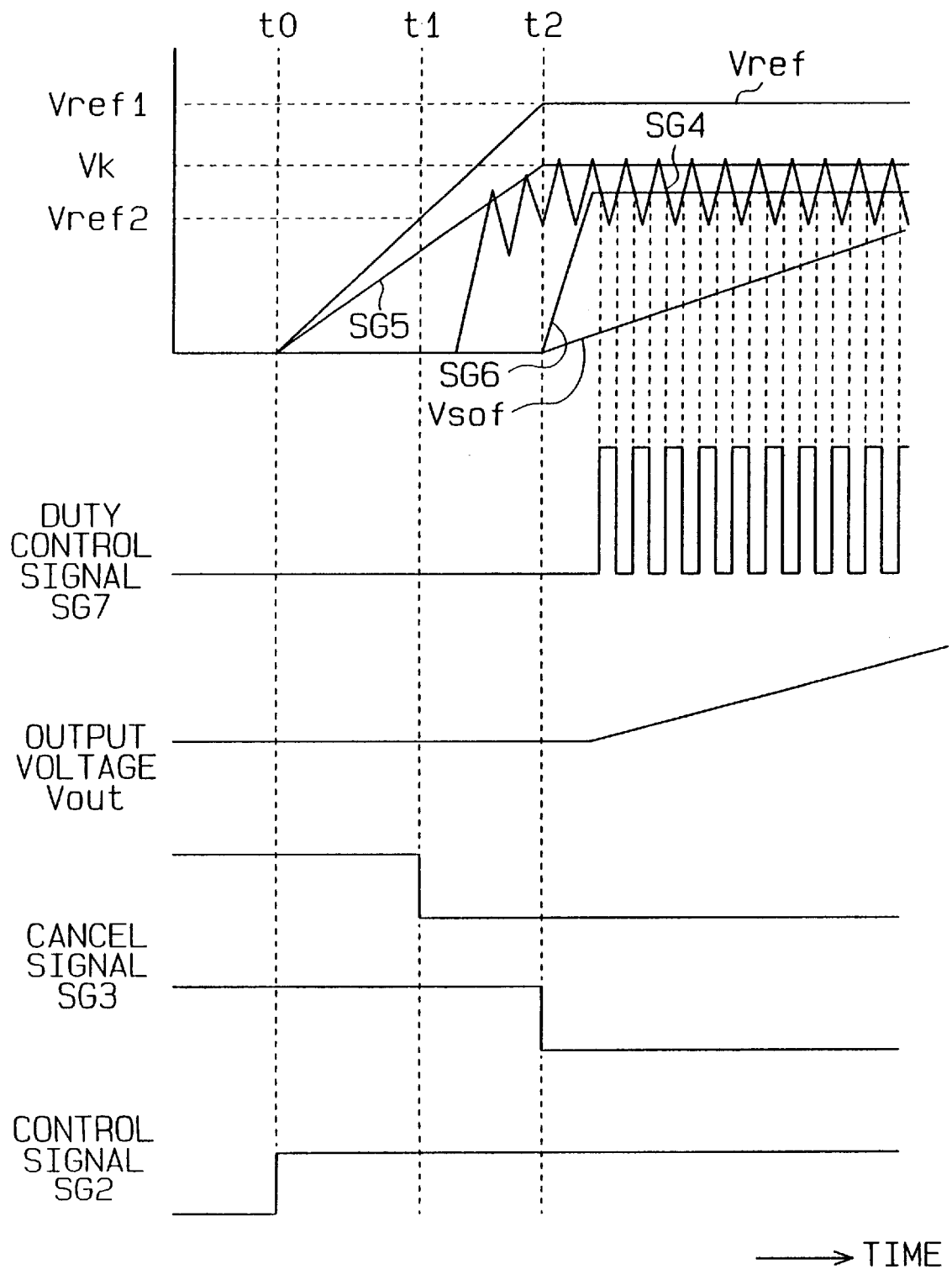
FIG. 15 is a waveform diagram for explaining the operation of the DC—DC converter of FIG. 14.

If the control signal SG2 high is supplied to the reference voltage generation circuit 211 from the external device at time t0, as shown in FIG. 15, the DC—DC converter 201 commences operation. In response to the control signal SG2 high, the reference voltage generation circuit 211 generates the reference voltage Vref on the basis of the drive source voltage Vcc. At this time, as shown in FIG. 15, the reference voltage Vref increases to the specified voltage Vref1 at a given rate. The gradually-increasing reference voltage Vref is supplied to the initial malfunction prevention circuit 212, the triangular wave oscillation circuit 213, the dead time circuit 214, the first noninverting input terminal of the error amplification circuit 215, the constant current circuit 216, and the reference voltage determination circuit 242. Since, at this time, the bias voltage has not yet reached the voltage which enables the initial malfunction prevention circuit 212 to operate, the cancel signal SG3 high is maintained.

The error amplification circuit 215, the PWM comparison circuit 217, and the output circuit 218 shift to an operative state on the basis of the increasing reference voltage Vref. Since the charge voltage Vsof supplied to the second noninverting input terminal of the error amplification circuit 215 is zero volts at this time, the error output signal SG6 from the error amplification circuit 215 attempts to increase at the same rate as the rate at which the reference voltage Vref increases. However, the short-circuit transistor 241 is in an on state, and therefore the voltage of the error output signal SG6 is retained at zero volts. The dead time circuit 214 supplies the limit signal SG5 proportional to the reference voltage Vref to the PWM comparison circuit 217.

Accordingly, the PWM comparison circuit 217 compares the error output signal SG6, retained at zero volts, with the triangular wave SG4 of the triangular wave oscillation circuit 213. The triangular wave oscillation circuit 213 has not yet commenced oscillation at this time, and the triangular wave signal SG4 is zero volts. The PWM comparison circuit 217 eventually outputs the duty control signal SG7 low. Since the second transistor 220 is in an on state, the duty control signal SG7 low is reliably retained. Accordingly, the signal SG1 low output from the output circuit 218 is maintained, and the output transistor 203 is held in an off state.

When the reference voltage Vref reaches the bias voltage which enables the initial malfunction prevention circuit 212 to operate, the initial malfunction prevention circuit 212 outputs a cancel signal SG3 low. In response to the cancel signal SG3 low, the second transistor 220 is turned on. The PWM comparison circuit 217 is still outputting the duty control signal SG7 low at this time, because the triangular wave oscillation circuit 213 has not yet commenced oscillation, and the error output signal SG6 is retained at zero volts.

As shown in FIG. 15, the triangular wave oscillation circuit 213 commences oscillation and outputs the triangular wave signal SG4 to the PWM comparison circuit 217. That is, the level of the triangular wave signal SG4 crosses the level of the limit signal SG5. However, since the short-circuit transistor 241 still remains in an on state, the error output signal SG6 is retained at zero volts. Accordingly, the PWM comparison circuit 217 continues to output the duty control signal SG7 low.

When at time t2, the reference voltage Vref reaches the specified voltage Vref1, the reference voltage determination circuit 242 outputs the second cancel signal SG3a low. As a result, the first transistor 219 and the short-circuit transistor 241 are turned off. The capacitor 222 commences charging operation, and the charge voltage Vsof is supplied to the second noninverting input terminal of the error amplification circuit 215. Since the charge voltage Vsof is lower than the reference voltage Vref, the error amplification circuit 215 compares the output voltage Vout with the charge voltage Vsof at this time and amplifies the potential difference. The amplified potential difference is output to the PWM comparison circuit 217 as the error output signal SG6. After time t2, the charge voltage Vsof gradually increases, and hence the output voltage SG6 of the error amplification circuit 215 is increased to such an extent as to enter the range of amplitude of the triangular wave signal SG4, which causes the output voltage Vout to follow the charge voltage Vsof.

Therefore, the duty control signal SG7 of the PWM comparison circuit 217 is low until the output voltage SG6 enters and, for the first time, crosses the range of amplitude of the triangular wave signal SG4. Hence, the output transistor 203 remains in an off state. When the error output signal SG6 reaches the range of amplitude of the triangular wave signal SG4, the PWM comparison circuit 217 outputs the duty control signal SG7, which goes high when the error output signal SG6 is greater than the triangular wave signal SG4, and goes low when the error output signal SG6 is smaller than the triangular wave signal SG4.

Next, the DC—DC converter 201 controls the output voltage Vout so that it follows the increasing charge voltage Vsof. When the charge voltage Vsof reaches the specified voltage Vref1, the DC—DC converter 201 controls the output voltage Vout such that it is maintained at the reference voltage Vref (i.e., the specified voltage Vref1).

Although the short-circuit transistor 241 is connected between the output terminal of the error amplification circuit 215 and the ground GND in the fifth embodiment, the short-circuit transistor 241 may be omitted from the DC—DC converter in the manner shown in FIG. 16. More specifically, in a DC—DC converter 312, shown in FIG. 16, the error amplification circuit 215 receives the drive source voltage Vcc via a drive transistor 244, which receives the reference voltage Vref. A short-circuit transistor 245 forming a stop circuit is connected between the base of the drive transistor 244 and the ground GND. The base of the short-circuit transistor 245 receives the second cancel signal SG3a from the reference voltage determination circuit 242. Accordingly, the error amplification circuit 215 is prevented from receiving the drive source voltage Vcc until the second cancel signal SG3a from the reference voltage determination circuit 242 goes low; i.e., until the triangular wave oscillation circuit 213 commences oscillation.

Sixth Embodiment

Figure 17A:
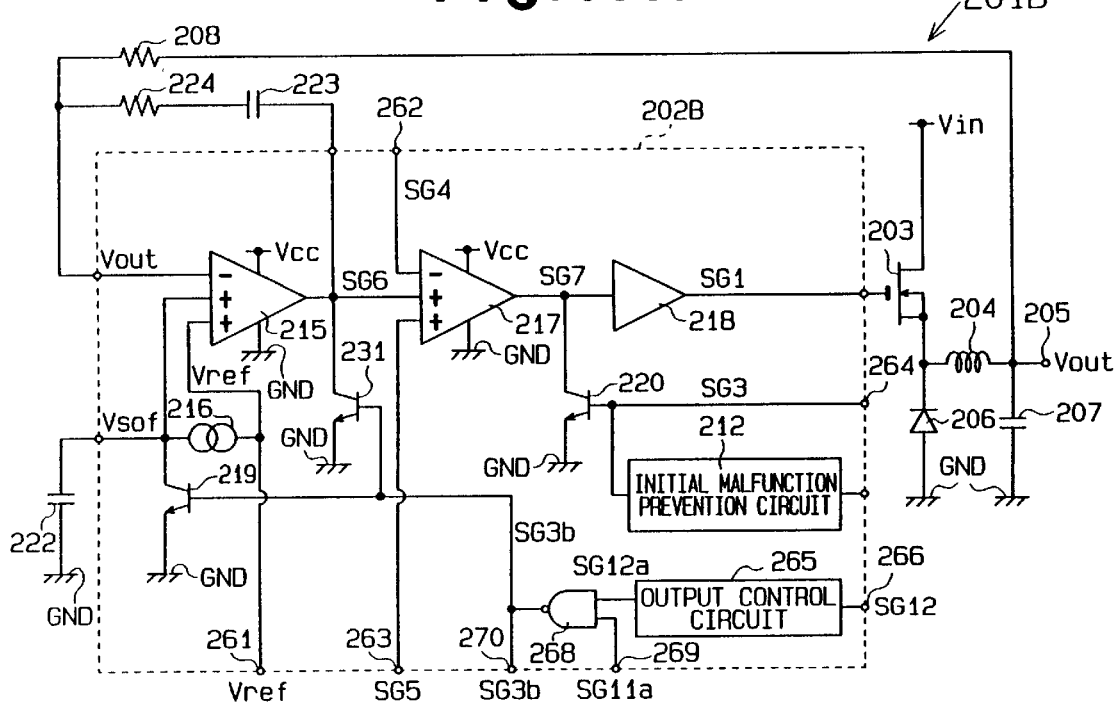
FIGS. 17A and 17B are circuit diagrams showing a DC—DC converter in accordance with a sixth embodiment of the present invention.
Figure 17B:
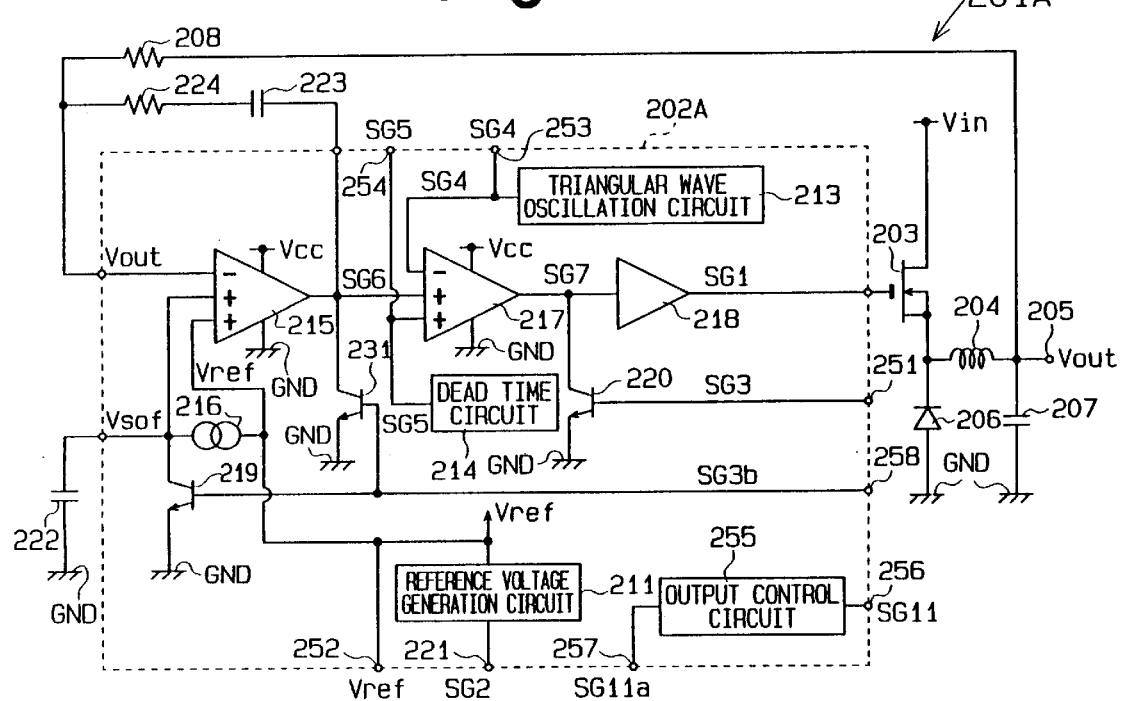

FIGS. 17A and 17B shows a DC—DC converter in accordance with a sixth embodiment of the present invention. The DC—DC converter according to the sixth embodiment comprises first and second DC—DC converter sections 201A and 201B.

The first DC—DC converter section 201A (FIG. 17B) is formed by modification of the control circuit 202 of the DC—DC converter 310 according to the first embodiment shown in FIG. 12. A control circuit 202A is equipped with an external input terminal 251 for receiving the cancel signal SG3 in place of the initial malfunction prevention circuit 212. The cancel signal SG3 is supplied only to the base of the second transistor 220.

The control circuit 202A further comprises an external output terminal 252 for outputting the reference voltage Vref produced by the reference voltage generation circuit 211 to the second DC—DC converter section 201B (FIG. 17A); an external output terminal 253 for outputting the triangular wave signal SG4 produced by the triangular wave oscillation circuit 213 to the second DC—DC converter section 201B; and an external output terminal 254 for outputting the limit signal SG5 generated by the dead time circuit 214 to the DC—DC converter section 201B.

Further, the control circuit 202A has an output control circuit 255. The output control circuit 255 receives a first output control signal SG11 from an external device (not shown) via an external output control input terminal 256. The external device outputs the first output control signal SG11 high when there is a need to activate the DC—DC converter section 201A. The control circuit 202A outputs the first output control signal SG11 to an external output terminal 257 as a first internal output control signal SG11a. The first internal output control signal SG11a is output to the second DC—DC converter section 201B.

The control circuit 202A receives a third cancel signal SG3b output from the second DC—DC converter section 201B via an external input terminal 258 and feeds the third cancel signal SG3b to the base of each of the first transistor 219 and the short-circuit transistor 231.

Similarly, the second DC—DC converter section 201B is formed by modification of the control circuit 202 of the DC—DC converter 310 according to the first embodiment shown in FIG. 12. The control circuit 202B of the second DC—DC converter section 201B comprises external input terminals 261, 262, and 263 for receiving the reference voltage Vref, the triangular wave signal SG4, and the control signal SG5 from the first DC—DC converter section 201A in place of the reference signal generation circuit 211, the triangular wave oscillation circuit 213, and the dead time circuit 214.

The initial malfunction prevention circuit 212 in the control circuit 202B is equipped with an external output terminal 264 for outputting the cancel signal SG3 to the first DC—DC converter section 201A. In the control circuit 202B, the cancel signal SG3 is supplied to only the base of the second transistor 220.

The control circuit 202B is provided with an output control circuit 265. The output control circuit 265 receives a second control signal SG12 from an external device (not shown) via an external output control input terminal 266. The external device outputs the second output control signal SG12 high when there is a need to activate the second DC—DC converter section 201B. The control circuit 202B outputs the second output control signal SG12 to a NAND circuit 268 as the second internal output control signal SG12a.

The NAND circuit 268 forming a determination circuit comprises a NAND circuit having two input terminals. One input terminal receives the second internal output control signal SG12a, and the other input terminal receives the first internal output control signal SG11a from the control circuit 202A of the first DC—DC converter section 201A via an external input terminal 269 provided for the control circuit 202B. As a result, the signal output from the NAND circuit 268 goes low when both the first internal output control signal SG11a and the second internal output control signal SG12a are high. In other cases, the output signal from the NAND circuit 268 goes high. The signal output from the NAND circuit 268 is supplied, as a third cancel signal SG3b, to the base of each of the first transistor 219 and the short-circuit transistor 231 provided in the control circuit 202B. The third cancel signal SG3b is also output to the control circuit 202A via an external output terminal 270.

In the sixth embodiment, a hold circuit comprises the first transistor 219 and the short-circuit transistor 231 provided in the control circuits 202A and 202B, and the NAND circuit 268 of the control circuit 202B.

Figure 18:
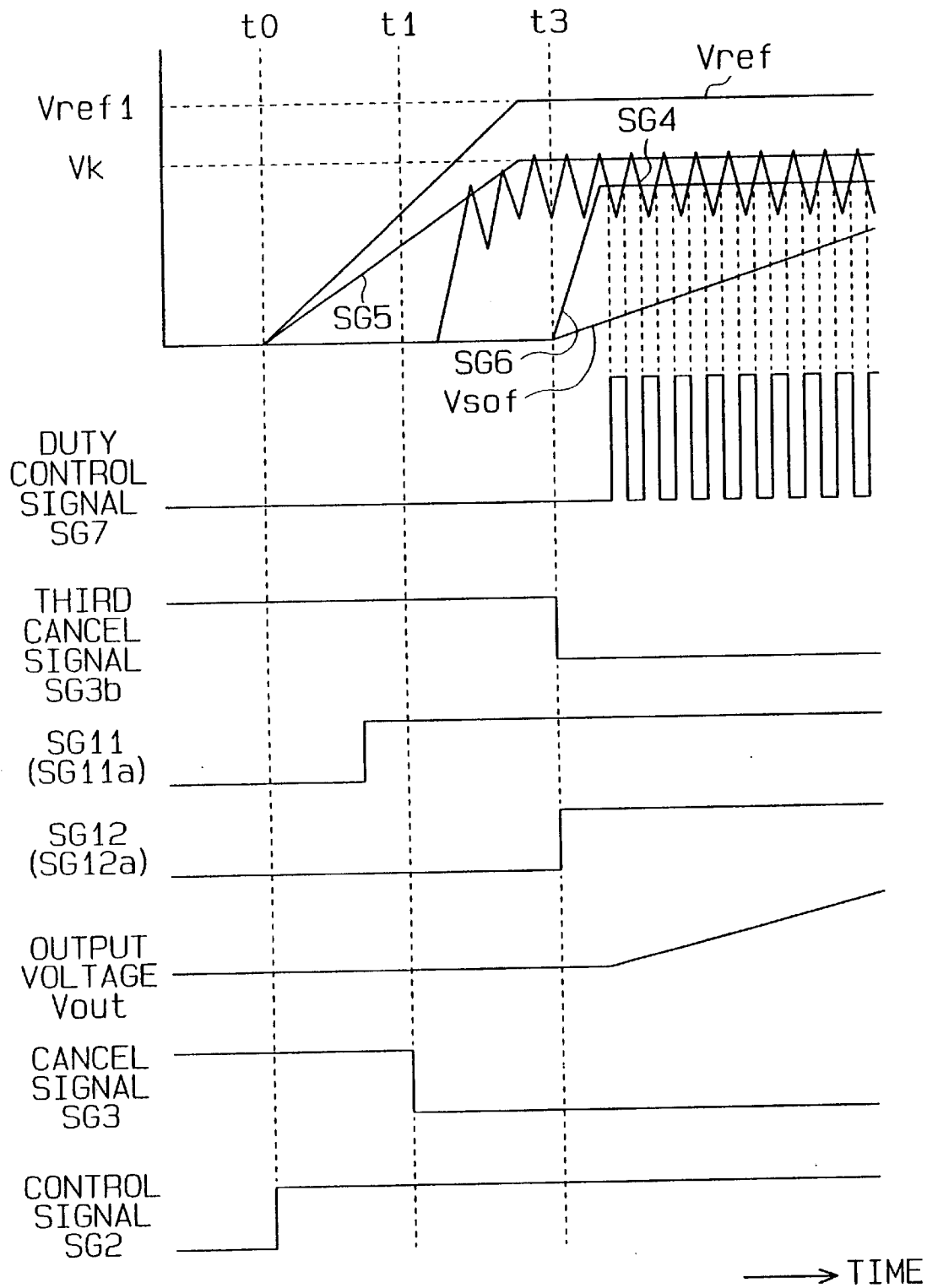
FIG. 18 is a waveform diagram for explaining the operation of the DC—DC converter according to the sixth embodiment.

The operation of the DC—DC converter of the sixth embodiment will be described below. If the control signal SG2 high is supplied to the reference voltage generation circuit 211 of the control circuit 202A of the first DC—DC converter section 201A from the external device at time t0 as shown in FIG. 18, the reference voltage generation circuit 211 commences generation of the reference voltage Vref and supplies the reference voltage to each of the circuits within the control circuit 202A. Similarly, the reference voltage Vref is supplied to each of the circuits within the control circuit 202B of the second DC—DC converter section 201B. As a result, the first and second DC—DC converter sections 201A and 201B commence operation.

Since the bias voltage has not yet reached the voltage which allows the initial malfunction prevention circuit 212 to operate, the cancel signal SG3 is high. Further, the first and second output control signals SG11, SG12 high are not input to the first and second DC—DC converter sections 201A, 201B from the external device. Accordingly, the third cancel signal SG3b is high.

If the output control signal SG11 high is input to the first DC—DC converter section 201A prior to the second output control signal SG12, the NAND circuit 268 holds the third cancel signal SG3b high, because the second output control signal SG12 is not high. Accordingly, both the first transistor 219 and the short-circuit transistor 231 of each of the first and second DC—DC converter sections 201A and 201B are in an off state.

When the reference voltage Vref reaches the bias voltage which enables the initial malfunction prevention circuit 212 to operate, the initial malfunction prevention circuit 212 outputs the cancel signal SG3 low. In response to the cancel signal SG3 low, the second transistor 220 is turned on. The PWM comparison circuit 217 is still outputting the duty control signal SG7 low at this time, because the triangular wave oscillation circuit 213 has not yet commenced oscillation, and the error output signal SG6 is retained at zero volts.

In due time, as shown in FIG. 18, the triangular wave oscillation circuit 213 commences oscillation and outputs the triangular wave signal SG4 to the PWM comparison circuit 217. That is, the level of the triangular wave signal SG4 crosses the level of the limit signal SG5. However, the short-circuit transistor 231 still remains in an on state and the error output signal SG6 is retained at zero volts. Accordingly, the PWM comparison circuit 217 continues to output the duty control signal SG7 low.

When the output control signal SG12 high is input to the second DC—DC converter section 201B at time t3, shown in FIG. 18, the NAND circuit 268 outputs the third cancel signal SG3b low. As a result, the first transistor 219 and the short-circuit transistor 231 of each of the first and second DC—DC converter sections 201A and 201B are turned off.

The capacitor 222 for gentle start-up purposes of each of the first and second DC—DC converter sections 201A and 20B commences charging operation, and the charge voltage Vsof is supplied to the second noninverting input terminal of the error amplification circuit 215. Since the charge voltage Vsof is lower than the reference voltage Vref, the error amplification circuit 215 compares the output voltage Vout with the charge voltage Vsof and amplifies the potential difference. The amplified potential difference is output to the PWM comparison circuit 217 as the error output signal SG6. After time t3, the charge voltage Vsof gradually increases, and hence the output voltage SG6 of the error amplification circuit 215 is increased to such an extent to enter the range of amplitude of the triangular wave signal SG4 which causes the output voltage Vout to follow the charge voltage Vsof.

Therefore, the duty control signal SG7 of the PWM comparison circuit 217 is low until the output voltage SG6 enters and, for the first time, crosses the range of amplitude of the triangular wave signal SG4. Hence, the output transistor 203 still remains in an off state.

When the error output signal SG6 reaches the range of amplitude of the triangular wave signal SG4, the PWM comparison circuit 217 outputs the duty control signal SG7, which goes high when the error output signal SG6 is greater than the triangular wave signal SG4, and goes low when the error output signal SG6 is smaller than the triangular wave signal SG4.

Then, the first and second DC—DC converter sections 201A and 201B control the output voltage Vout so that it follows the increasing charge voltage Vsof. When the charge voltage Vsof reaches the specified voltage Vref1, the first and second DC—DC converter sections 201A and 201B control the output voltage Vout such that it is maintained at the reference voltage Vref (i.e., the specified voltage Vref1). The thus-controlled output voltage is supplied to each of the semiconductor integrated circuit devices 301.

In the sixth embodiment, the first and second DC—DC converter sections 201A, 201B supply the output voltages Vout to each of the semiconductor integrated circuit devices 301 at substantially the same time, while substantially simultaneously commencing gentle start-up operation. Accordingly, the stable output voltage Vout is substantially simultaneously supplied to each of the semiconductor integrated circuit devices, thereby preventing faulty operations of the semiconductor integrated circuit devices, which would otherwise be caused by a difference in power-up timing. The present invention is particularly effective in a case where the first and second output control signals SG11 and SG12 are identical and are input to one of the DC—DC converter sections with a lag because of the capacity of a wire.

In the fourth through sixth embodiments, the first noninverting input terminal of the error amplification circuit 215 receives the reference voltage Vref from the reference voltage generation circuit 211, and the second noninverting input circuit terminal of the same receives the charge voltage Vsof which increases to the specified voltage Vref1. Furthermore, the first noninverting input terminal may be omitted. In this case, the error amplification circuit 215 comprises an input terminal for receiving the charge voltage Vsof which increases to the specified voltage Vref1 of the reference voltage Vref, and an input terminal for receiving the output voltage Vout. The error amplification circuit 215 amplifies the potential difference between the charge voltage Vsof and provides the output voltage Vout and the amplified potential difference as the error output signal SG6.

In the fourth through sixth embodiments, the output voltage Vout is directly input to the inverting input terminal of the error amplification circuit 215. However, a voltage divided by a voltage dividing circuit may be input to the inverting input terminal. In such a case, the control value of the output voltage Vout is changed by utilization of the ratio of division of a voltage by the voltage dividing circuit, as required.

The output transistor 203 may include a P-channel MOS transistor. In such a case, for example, the output circuit 218 may require generation of the output signal SG1 which is the inverse of the duty control signal SG7. Alternatively, the output transistor 203 may include a bipolar transistor.

The output circuit 218 provided for the fourth through sixth embodiments may be omitted. A short-circuit transistor may be connected between the output terminal of the output circuit 218 and the ground GND in the fourth through sixth embodiments, and the cancel signal SG3, the second cancel signal SG3a, or the third cancel signal SG3b may be input to the base of the short-circuit transistor.

In the fourth embodiment, the first and second transistors 219, 220 and the short-circuit transistor 231 may be controlled through use of the reference voltage determination circuit 242 disclosed in the fifth embodiment in place of the initial malfunction prevention circuit 212.

In the fifth embodiment or the modification of the fifth embodiment, the first transistor 219 and the short-circuit transistors 241, 245 may be controlled through use of the initial malfunction prevention circuit 212 disclosed in the first embodiment in place of the reference voltage determination circuit 242.

The waveform of the triangular wave oscillation signal SG4 of the triangular wave oscillation circuit 213 may be practiced in the form of a saw-tooth triangular wave signal.

The bipolar transistors 219, 220, 231, 241, 244, and 245 disclosed in the fourth through sixth embodiments may be replaced with MOS transistors.

Although the control circuit 202 is preferably formed on a single chip semiconductor integrated circuit device in the fourth through sixth embodiments, circuit components of the control circuit may be formed over a plurality of semiconductor integrated circuit devices, as required, and electrically connected together so as to constitute the control circuit 202; e.g., by formation of the triangular wave oscillation circuit 213 on another semiconductor integrated circuit device.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A control circuit for controlling an output transistor of a DC to DC converter, wherein the output transistor outputs a DC output voltage signal, said control circuit comprising:
   a first controller circuit, coupled to the output transistor, for driving the output transistor in response to an external input control signal; and
   a second controller circuit for performing a discharge operation in response to the input control signal being inactive and controlling the first controller circuit to gradually reduce an operating time of the output transistor when the discharge operation is performed, wherein the second controller includes,
      a discharge circuit for performing the discharge operation at a predetermined time constant to generate a discharge voltage signal in response to the input control signal being inactive,
      an oscillator that generates a triangular wave signal having a predetermined frequency, and
      a comparison circuit, coupled to the oscillator, that compares the discharge voltage signal and the triangular wave signal and generates a comparison output signal, the comparison output signal being used to gradually reduce the operation time of the output transistor, and wherein the comparison circuit comprises,
         an error amplifier for receiving a predetermined reference voltage, the discharge voltage signal and the DC output voltage signal and for generating an error amplified voltage signal, which corresponds to a potential difference between the DC output voltage and one of the predetermined reference voltage and the discharge voltage signal; and
         a comparator, coupled to the error amplifier and the oscillator, for comparing the error amplified voltage signal and the triangular wave signal to produce the comparison output signal.

2. A control circuit for controlling an output transistor of a DC to DC converter, wherein the output transistor outputs a DC output voltage signal, said control circuit comprising:
   a first controller circuit, coupled to the output transistor, for driving the output transistor in response to an external input control signal; and
   a second controller circuit for performing a discharge operation in response to the input control signal being inactive and controlling the first controller circuit to gradually reduce an operating time of the output transistor when the discharge operation is performed, wherein the second controller includes,
      a discharge circuit for performing the discharge operation at a predetermined time constant to generate a discharge voltage signal in response to the input control signal being inactive,
      an oscillator that generates a triangular wave signal having a predetermined frequency, and
      a comparison circuit, coupled to the oscillator, that compares the discharge voltage signal and the triangular wave signal and generates a comparison output signal, the comparison output signal being used to gradually reduce the operation time of the output transistor, and wherein the comparison circuit comprises,
         an error amplifier for receiving a predetermined reference voltage and the DC output voltage signal and for generating an error amplified voltage signal, which corresponds to a potential difference between the DC output voltage and one of the predetermined reference voltage and the DC output voltage; and
         a comparator, coupled to the error amplifier and the oscillator, for comparing the triangular wave signal and one of the error amplified voltage signal and the discharge voltage signal to produce the comparison output signal.

3. The circuit of claim 1, wherein the discharge circuit further comprises:
   a capacitor;
   a time-constant element for discharging electric charge from the capacitor at a predetermined time constant; and
   a changeover circuit for selectively performing a charge operation and the discharge operation by connecting and disconnecting the capacitor to the time-constant element in response to the inactivate control signal.

4. The circuit of claim 3, further comprising a bias hold circuit for checking a discharge voltage of the capacitor and for maintaining the first and second controller circuits in an active state from when the control signal is inactivate until the discharge voltage of the capacitor is equal to or less than a predetermined voltage.

5. The circuit of claim 3, wherein the time-constant element includes a current source for permitting flow of a discharging current.

6. A method of driving a DC—DC converter control circuit for controlling an output transistor, the method comprising the steps of:

providing an error amplification circuit having a reference voltage input terminal and a detected voltage input terminal, the reference voltage input terminal receiving a reference voltage which changes toward a specified voltage and maintains at the specified voltage, the detected voltage input terminal receiving a detected voltage produced by a switching action of the output transistor;

comparing the reference voltage with the detected voltage and generating an error amplified output signal using the error amplification circuit;

providing a triangular wave oscillation circuit for generating a triangular wave signal;

providing a PWM comparison circuit having a first input terminal receiving the triangular wave signal and a second input terminal receiving the error amplified output signal;

comparing the triangular wave signal and the error amplified output signal with the PWM comparison circuit to generate a control signal;

turning on and off the output transistor by supplying the control signal thereto such that the detected voltage approaches the reference voltage; and holding the output transistor in an off state until the triangular wave oscillation circuit commences generation of the triangular wave signal, wherein the reference voltage comprises a first reference voltage as the specified voltage and a second reference voltage which changes toward the first reference voltage, and wherein the error amplification circuit includes a first reference voltage input terminal for receiving the first reference voltage and a second reference voltage input terminal for receiving the second reference voltage.

7. A method of driving a DC—DC converter control circuit for controlling an output transistor, the method comprising the steps of;

providing an error amplification circuit having a detected voltage input terminal and first and second reference voltage input terminals, the detected voltage input terminal receiving a detected voltage produced by a switching action of the output transistor, the first reference voltage input terminal receiving a first reference voltage as a specified voltage, and the second reference voltage input terminal receiving a second reference voltage which changes toward the first reference voltage;

comparing the second reference voltage with the detected voltage using the error amplification circuit and generating an error amplified output signal when the second reference voltage changes;

comparing the first reference voltage with the detected voltage using the error amplification circuit and generating an error amplified output signal when the second reference voltage is unchanged;

providing a triangular wave oscillation circuit for generating a triangular wave signal;

providing a PWM comparison circuit having a first input terminal receiving the triangular wave signal and a second input terminal receiving the error amplified output signal;

comparing the triangular wave signal and the error amplified output signal with the PMW comparison circuit to generate a control signal;

turning on and off the output transistor by supplying the control signal thereto such that the detected voltage approaches the first and second reference voltages;

grounding the second reference voltage input terminal and at least one of the outputs of the error amplification circuit and the PWM comparison circuit until the triangular wave oscillation circuit commences generation of the triangular wave signal; and disconnecting the second reference voltage input terminal and the at least one of the outputs of the error amplification circuit and the PWM comparison circuit after the triangular wave oscillation circuit has commenced generation of the triangular wave signal.

8. A DC—DC converter control circuit for controlling an output transistor, comprising:

an error amplification circuit for receiving a reference voltage, which changes toward a specified voltage and maintains at the specified voltage, and receiving a detected voltage produced by a switching action of the output transistor, the error amplification circuit further comparing the reference voltage with the detected voltage to output an error amplified output signal;

a triangular wave oscillation circuit for generating a triangular wave signal;

a PWM comparison circuit, coupled to the error amplification circuit and the triangular wave oscillation circuit, for receiving the triangular wave signal and the error amplified output signal and for comparing the triangular wave signal and the error amplified output signal to generate a control signal, the control signal used for turning on and off the output transistor such that the detected voltage approaches the reference voltage; and a holding circuit for holding the output transistor in an off state until the triangular wave oscillation circuit commences generation of the triangular wave signal.

9. The circuit of claim 8, wherein the holding circuit includes:

a short-circuit transistor, connected between a ground and at least one of the outputs of the error amplification circuit and the PWM comparison circuit, being controlled to be in an on state until the triangular wave oscillation circuit commences generation of the triangular wave signal and to turn off after the triangular wave oscillation circuit has commenced the triangular wave signal; and a gentle start-up transistor, connected between the ground and a reference voltage input terminal of the error amplification circuit, being controlled to be in an on state until the triangular wave oscillation circuit commences generation of the triangular wave signal and to turn off after the triangular wave oscillation circuit has commenced generation of the triangular wave signal.

10. The circuit of claim 9, wherein the holding circuit includes an initial malfunction prevention circuit for producing a cancel signal for controlling the short-circuit and gentle start-up transistors.

11. The circuit of claim 9, further comprising a reference voltage generation circuit for producing the reference voltage and providing the reference voltage to the error amplification circuit.

12. The circuit of claim 9, wherein the short-circuit transistor includes a first short-circuit transistor connected between ground and the output of the error amplification circuit and a second short-circuit transistor connected between the ground and the output of the PWM comparison circuit.

13. A DC—DC converter control circuit for controlling an output transistor, comprising:

an error amplification circuit for receiving a detected voltage produced by a switching action of the output transistor, a first reference voltage as a specified voltage, and a second reference voltage which changes toward the first reference voltage, the error amplification circuit further comparing the second reference voltage with the detected voltage to output an error amplified output signal when the second reference voltage changes, the error amplification circuit comparing the first reference voltage with the detected voltage to output the error amplified output signal when the second reference voltage is unchanged;

a triangular wave oscillation circuit for generating a triangular wave signal;

a PWM comparison circuit for receiving the triangular wave signal and the error amplified output signal and for comparing the triangular wave signal and the error amplified output signal to generate a control signal, the control signal used for controlling the output transistor such that the detected voltage approaches the first and second reference voltages;

a short-circuit transistor connected between a ground and at least one of the outputs of the error amplification circuit and the PWM comparison circuit;

a gentle start-up transistor connected between the ground and a second reference voltage input terminal of the error amplification circuit; and an initial malfunction prevention circuit for producing a cancel signal for turning on the short-circuit and gentle start-up transistors until the triangular wave oscillation circuit commences generation of the triangular wave signal and for turning off the short-circuit and gentle start-up transistors after the triangular wave oscillation circuit has commenced generation of the triangular wave signal.

14. A DC—DC converter control circuit for controlling an output transistor, comprising:

a reference voltage generation circuit for generating an reference voltage;

an error amplification circuit for receiving the reference voltage which changes toward a specified voltage and maintains at the specified voltage, and receiving a detected voltage produced by a switching action of the output transistor, the error amplification circuit further comparing the reference voltage with the detected voltage to output an error amplified output signal;

a triangular wave oscillation circuit for generating a triangular wave signal;

a PWM comparison circuit, coupled to the error amplification circuit and the triangular wave oscillation circuit, for receiving the triangular wave signal and the error amplified output signal and for comparing the triangular wave signal and the error amplified output signal to generate a control signal, the control signal used for turning on and off the output transistor such that the detected voltage approaches to reference voltage;

a reference voltage determination circuit for receiving the reference voltage and the specified voltage and for determining whether the reference voltage has reached the specified voltage and outputting a determination signal therefor; and a stop circuit for receiving the determination signal and turning off the output transistor while the reference voltage has reached to the specified voltage.

15. The circuit of claim 14, wherein the stop circuit includes a short-circuit transistor connected between an output of the error amplification circuit and a ground and responsive to the determination signal.

16. The circuit of claim 14, wherein the stop circuit includes a short-circuit transistor for interrupting the supply of power to the error amplification circuit in response to the determination signal.

17. The circuit of claim 14, wherein the reference voltage comprises a first reference voltage as the specified voltage and a second reference voltage, which changes toward the first reference voltage, and wherein the error amplification circuit has a first reference voltage input terminal for receiving the first reference voltage and a second reference voltage input terminal for receiving the second reference voltage.

18. A DC—DC converter comprising:

a smoothing circuit including an output coil and a capacitor;

an output transistor, connected to the smoothing circuit, for causing an output voltage at an output terminal of the DC—DC converter;

a first reference voltage generation circuit for generating a first reference voltage;

a second reference voltage generation circuit for receiving the first reference voltage and producing a second reference voltage, which changes to a specified voltage;

an error amplification circuit for receiving the output voltage, the first reference voltage as the specified voltage and the second reference voltage, the error amplification circuit further comparing the second reference voltage with the output voltage to output an error amplified output signal when the second reference voltage changes, the error amplification circuit comparing the first reference voltage with the output voltage to output the error amplified output signal when the second reference voltage is unchanged;

a triangular wave oscillation circuit for generating a triangular wave signal;

a PWM comparison circuit for receiving the triangular wave signal and the error amplified output signal and for comparing the triangular wave signal and the error amplified output signal to generate a control signal, the control signal for turning on and off the output transistor such that the output voltage approaches the first and second reference voltage; and a holding circuit for holding the output transistor in an off state until the triangular wave oscillation circuit commences generation of the triangular wave signal, wherein the holding circuit includes a short-circuit transistor connected between a ground and at least one of the outputs of the error amplification circuit and the PWM comparison circuit;

a gentle start-up transistor connected between the ground and a second reference voltage input terminal of the error amplification circuit; and an initial malfunction prevention circuit for producing a cancel signal for turning on the short-circuit and gentle start-up transistors until the triangular wave oscillation circuit commences generation of the triangular wave signal and for turning off the short-circuit and gentle start-up transistors after the triangular wave oscillation circuit has commenced generation of the triangular wave signal.

19. A DC—DC converter having a plurality of control circuits for controlling a plurality of output transistors, respectively, each control circuit comprising:

an error amplification circuit for receiving a reference voltage, which changes toward a specified voltage and maintains at the specified voltage, and receiving a detected voltage produced by a switching action of the output transistor, the error amplification circuit further comparing the reference voltage with the detected voltage to output an error amplified output signal;

a triangular wave oscillation circuit for generating a triangular wave signal; and a PWM comparison circuit, coupled to the error amplification circuit and the triangular wave oscillation circuit, for receiving the triangular wave signal and the error amplified output signal and for comparing the triangular wave signal and the error amplified output signal to generate a control signal, the control signal for turning on and off the output transistor such that the detected voltage approaches the reference voltage;

wherein one of the control circuits has a hold circuit for receiving a plurality of activation signals for activating the control circuits, respectively, and holding all of the output transistors in an off state until all of the activation signals are provided to the control circuits, respectively, wherein the hold circuit includes a short-circuit transistor connected between a ground and at least one of the outputs of the error amplification circuit and the PWM comparison circuit;

a gentle start-up transistor connected between the ground and a reference voltage input terminal of the error amplification circuit; and a determination circuit for determining whether all of the activation signals have been respectively provided to the control circuits and providing a determination signal, which controls the short-circuit and the gentle start-up transistors.

20. An electronic device having a DC—DC converter, the DC—DC converter comprising:

a smoothing circuit including an output coil and a capacitor;

an output transistor, connected to the smoothing circuit, for causing an output voltage at an output terminal of the DC—DC converter;

a first reference voltage generation circuit for generating a first reference voltage;

a second reference voltage generation circuit for receiving the first reference voltage and producing a second reference voltage, which changes to a specified voltage;

an error amplification circuit for receiving the output voltage, the first reference voltage as the specified voltage and the second reference voltage, the error amplification circuit further comparing the second reference voltage with the output voltage to output an error amplified output signal when the second reference voltage changes, the error amplification circuit comparing the first reference voltage with the output voltage to output the error amplified output signal when the second reference voltage is unchanged;

a triangular wave oscillation circuit for generating a triangular wave signal;

a PWM comparison circuit for receiving the triangular wave signal and the error amplified output signal and for comparing the triangular wave signal and the error amplified output signal to generate a control signal, the control signal for controlling the output transistor such that the output voltage approaches the first and second reference voltage; and a holding circuit for holding the output transistor in an off state until the triangular wave oscillation circuit commences generation of the triangular wave signal, wherein the holding circuit includes a short-circuit transistor connected between a ground and at least one of the outputs of the error amplification circuit and the PWM comparison circuit;

a gentle start-up transistor connected between the ground and a second reference voltage input terminal of the error amplification circuit; and an initial malfunction prevention circuit for producing a cancel signal for turning on the short-circuit and gentle start-up transistors until the triangular wave oscillation circuit commences generation of the triangular wave signal and for turning off the short-circuit and gentle start-up transistors after the triangular wave oscillation circuit has commenced generation of the triangular wave signal.

21. An electronic device having a DC—DC converter, the DC—DC converter having a plurality of control circuits for controlling a plurality of output transistors, respectively, each control circuit comprising:

an error amplification circuit for receiving a reference voltage, which changes toward a specified voltage and maintains at the specified voltage, and receiving a detected voltage produced by a switching action of the output transistor, the error amplification circuit further comparing the reference voltage with the detected voltage to output an error amplified output signal;

a triangular wave oscillation circuit for generating a triangular wave signal; and a PWM comparison circuit, coupled to the error amplification circuit and the triangular wave oscillation circuit, for receiving the triangular wave signal and the error amplified output signal and for comparing the triangular wave signal and the error amplified output signal to generate a control signal, the control signal for turning on and off the output transistor such that the detected voltage approaches the reference voltage;

wherein one of the control circuits has a hold circuit for receiving a plurality of activation signals for activating the control circuits, respectively, and holding all of the output transistors in an off state until all of the activation signals are provided to the control circuits, respectively, wherein the hold circuit includes a short-circuit transistor connected between a ground and at least one of the outputs of the error amplification circuit and the PWM comparison circuit;

a gentle start-up transistor connected between the ground and a reference voltage input terminal of the error amplification circuit; and a determination circuit for determining whether all of the activation signals have been respectively provided to the control circuits and providing a determination signal, which controls the short-circuit and the gentle start-up transistors.

22. A series regulator for supplying a power supply voltage to a load circuit, the regulator comprising:

an output transistor coupled between a power supply and the load circuit, wherein the output transistor outputs an output voltage signal; and a circuit for controlling the output transistor, the circuit including:

a first controller circuit, coupled to the output transistor, for driving the output transistor in response to an external input control signal; and a second controller circuit for performing a discharge operation in response to the input control signal being inactive and controlling the first controller circuit to gradually reduce an operating time of the output transistor when the discharge operation is performed, wherein the second controller includes,
  a discharge circuit for performing the discharge operation at a predetermined time constant to generate a discharge voltage signal in response to the input control signal being inactivate,
  an oscillator that generates a triangular wave signal having a predetermined frequency, and
  a comparison circuit, coupled to the oscillator, that compares the discharge voltage signal and the triangular wave signal and generates a comparison output signal, the comparison output signal being used to gradually reduce the operation time of the output transistor, and wherein the comparison circuit comprises,
    an error amplifier for receiving a predetermined reference voltage, the discharge voltage signal and the output voltage signal and for generating an error amplified voltage signal, which corresponds to a potential difference between the output voltage and one of the predetermined reference voltage and the discharge voltage signal; and
    a comparator, coupled to the error amplifier and the oscillator, for comparing the error amplified voltage signal and the triangular wave signal to produce the comparison output signal.

23. A series regulator for supplying a power supply voltage to a load circuit, the regulator comprising:
  an output transistor coupled between a power supply and the load circuit, wherein the output transistor outputs an output voltage signal; and
  a circuit for controlling the output transistor, the circuit including:
    a first controller circuit, coupled to the output transistor, for driving the output transistor in response to an external input control signal; and
    a second controller circuit for performing a discharge operation in response to the input control signal being inactive and controlling the first controller circuit to gradually reduce an operating time of the output transistor when the discharge operation is performed, wherein the second controller includes,
      a discharge circuit for performing the discharge operation at a predetermined time constant to generate a discharge voltage signal in response to the input control signal being inactive,
      an oscillator that generates a triangular wave signal having a predetermined frequency, and
      a comparison circuit, coupled to the oscillator, that compares the discharge voltage signal and the triangular wave signal and generates a comparison output signal, the comparison output signal being used to gradually reduce the operation time of the output transistor, and wherein the comparison circuit comprises,
        an error amplifier for receiving a predetermined reference voltage and the output voltage signal and for generating an error amplified voltage signal, which corresponds to a potential difference between the predetermined reference voltage and the output voltage signal; and
        a comparator, coupled to the error amplifier and the oscillator, for comparing the triangular wave signal and one of the error amplified voltage signal and the discharge voltage signal to produce the comparison output signal.

24. The circuit of claim 22, wherein the discharge circuit further comprises:
  a capacitor;
  a time-constant element for discharging electric charge from the capacitor at a predetermined time constant; and
  a changeover circuit for selectively performing a charge operation and a discharge operation by connecting and disconnecting the capacitor to the time-constant element in response to the inactivate control signal.

25. The circuit of claim 24, further comprising a bias hold circuit for checking a discharge voltage of the capacitor and for maintaining the first and second controller circuits in an active state from when the control signal is inactivate until the discharge voltage of the capacitor is equal to or less than a predetermined voltage.

26. The circuit of claim 24, wherein the time-constant element includes a current source for permitting flow of a discharging current.

27. A control circuit that generates a voltage output signal for a DC to DC converter, comprising:
  a reference voltage generation circuit for generating a reference voltage;
  an initial malfunction prevention circuit that receives a drive source voltage and the reference voltage and generates a cancel signal, wherein the cancel signal is activated when the reference voltage reaches a predetermined voltage level;
  a triangular wave oscillation circuit for generating a triangular wave signal which oscillates within a predetermined voltage range;
  a dead time circuit that receives the reference voltage and divides the reference voltage to generate a limit signal;
  a constant current source that receives the reference voltage from the reference voltage generation circuit and generates a constant current signal;
  a first transistor having an emitter connected to ground, a collector connected to ground via a capacitor, and a base connected to the initial prevention malfunction circuit and receiving the cancel signal, wherein a charge voltage is generated at the collector of the first transistor;
  an error amplification circuit having a first, inverting input terminal that receives the voltage output signal, a second, noninverting input terminal connected to the collector of the first transistor and to the constant current source, and a third, noninverting input terminal connected to the reference voltage generation circuit for receiving the reference voltage, wherein the error amplification circuit compares the lower of either the reference voltage or the charge voltage with the voltage output signal and generates an error output signal;
  a PWM comparison circuit having a first, inverting input terminal that receives the triangular wave signal from the triangular wave oscillation circuit, a second, noninverting input terminal connected to an output terminal of the error amplification circuit, and a third, noninverting input signal connected to the dead time circuit for receiving the limit signal, wherein the 14PWM comparison circuit compares the lower of the error output signal or the limit signal with the triangular wave signal to generate a duty control signal;

an output circuit that receives the duty control signal and generates the voltage output signal;

a second transistor having a collector connected to an output terminal of the PWM comparison circuit, an emitter connected to ground, and a base connected to the initial prevention malfunction circuit for receiving the cancel signal; and a short-circuit transistor having a collector connected to an output terminal of the error amplification circuit, an emitter connected to ground, and a base connected to the base of the first transistor and to the initial malfunction prevention circuit for receiving the cancel signal therefrom, wherein the cancel signal is timed to lag behind commencement of normal oscillation by the triangular wave oscillation circuit.

28. The control circuit of claim 27, further comprising:

a reference voltage determination circuit connected to the reference voltage generation circuit, for generating a second cancel signal which is activated when the reference voltage reaches a predetermined voltage; and wherein the base of the first transistor is connected to the reference voltage determination circuit for receiving the second cancel signal and the base of the short-circuit transistor is connected to the base of the first transistor and to the reference voltage determination circuit for receiving the second cancel signal.

29. The control circuit of claim 28, further comprising:

a drive transistor connected between the error amplification circuit and the drive source voltage (Vcc), and wherein the collector of the short-circuit transistor is connected to the base of the drive transistor.

* * * * *

UNITED STATES PATENT AND TRADEMARK OFFICE
CERTIFICATE OF CORRECTION

PATENT NO. : 5,966,003
DATED : October 12, 1999
INVENTOR(S) : Takimoto et al.

It is certified that error appears in the above-indentified patent and that said Letters Patent is hereby corrected as shown below:

ON THE TITLE PAGE:

Item [75], please delete "Kyuichi Takimoto; Takashi Matsumoto; Toshiyuki Matsuyama; Seiya Kitagawa, all of Kawasaki, Japan" And insert therefor, -- Kyuichi Takimoto, Kasugai, Japan; Takashi Matsumoto, Kasugai, Japan; Toshiyuki Matsuyama, Kasugai, Japan; Seiya Kitagawa, Kawasaki, Japan --

Signed and Sealed this

Twenty-seventh Day of March, 2001

Attest:

NICHOLAS P. GODICI

*Attesting Officer*    *Acting Director of the United States Patent and Trademark Office*

UNITED STATES PATENT AND TRADEMARK OFFICE
CERTIFICATE OF CORRECTION

PATENT NO. : 5,966,003
DATED : October 12, 1999
INVENTOR(S) : Takimoto et al.

It is certified that error appears in the above-identified patent and that said Letters Patent is hereby corrected as shown below:

Title page should be deleted and substitute therefor the attached title page.

Signed and Sealed this

Twenty-fifth Day of December, 2001

Attest:

*Attesting Officer*

JAMES E. ROGAN
*Director of the United States Patent and Trademark Office*

United States Patent [19]
Takimoto et al.

[11] Patent Number: 5,966,003
[45] Date of Patent: Oct. 12, 1999

[54] DC-DC CONVERTER CONTROL CIRCUIT

[75] Inventors: Kyuichi Takimoto; Takashi Matsumoto; Toshiyuki Matsuyama; Seiya Kitagawa, all of Kawasaki, Japan

[73] Assignee: Fujitsu Limited, Kawasaki, Japan

[21] Appl. No.: 09/017,814

[22] Filed: Feb. 3, 1998

[30] Foreign Application Priority Data

May 15, 1997 [JP] Japan ................. 9-125972
Aug. 29, 1997 [JP] Japan ................. 9-234718

[51] Int. Cl.⁶ ........................... G05F 1/613
[52] U.S. Cl. ........................... 323/224; 323/222
[58] Field of Search ............... 323/224, 282, 323/284, 285, 901, 222

[56] References Cited

U.S. PATENT DOCUMENTS

| | | | |
|---|---|---|---|
| 4,716,510 | 12/1987 | Pace et al. | 363/49 |
| 4,806,842 | 2/1989 | Bittner | 323/222 |
| 5,646,513 | 7/1997 | Riggio, Jr. | 323/282 |

*Primary Examiner*—Shawn Riley
*Attorney, Agent, or Firm*—Nikaido, Marmelstein, Murray & Oram LLP

[57] ABSTRACT

A control circuit for controlling an output voltage of a DC—DC converter which supplies power to various semiconductor device, such as a processor and a memory, by way of an output transistor. The control circuit drives the output transistor in response to an external control signal. The control circuit gradually reduces an operating time of the output transistor by performing a discharge operation in response to the external control signal being inactive.

29 Claims, 18 Drawing Sheets

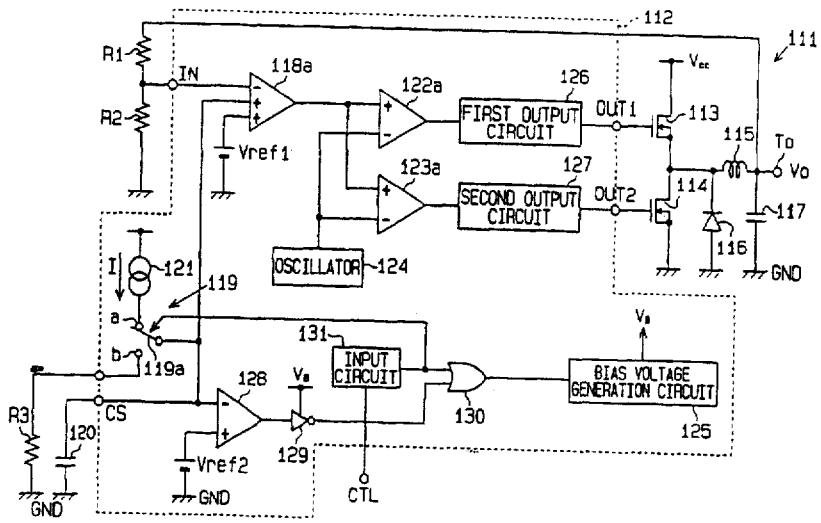

UNITED STATES PATENT AND TRADEMARK OFFICE
CERTIFICATE OF CORRECTION

PATENT NO. : 5,966,003 Page 1 of 1
APPLICATION NO. : 09/017814
DATED : October 12, 1999
INVENTOR(S) : Kyuichi Takimoto et al.

It is certified that error appears in the above-identified patent and that said Letters Patent is hereby corrected as shown below:

At column 30, lines 41-43, delete
" between the DC output voltage and one of the predetermined reference voltage and the DC output voltage and substitute with
--between the DC output voltage and the predeterminded reference voltage"--.

Signed and Sealed this

Twenty-eighth Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 5,966,003
APPLICATION NO. : 09/017814
DATED : October 12, 1999
INVENTOR(S) : Kyuichi Takimoto et al.

It is certified that error appears in the above-identified patent and that said Letters Patent is hereby corrected as shown below:

At column 30, lines 41-43, delete
" between the DC output voltage and one of the predetermined reference voltage and the DC output voltage;" and substitute with
--between the DC output voltage and the predetermined reference voltage--.

This certificate supersedes Certificate of Correction issued November 28, 2006.

Signed and Sealed this

Fifth Day of June, 2007

JON W. DUDAS
*Director of the United States Patent and Trademark Office*